US012587343B2

(12) United States Patent
Matsumura et al.

(10) Patent No.: US 12,587,343 B2
(45) Date of Patent: Mar. 24, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/277,913

(22) PCT Filed: Feb. 19, 2021

(86) PCT No.: PCT/JP2021/006328
§ 371 (c)(1),
(2) Date: Aug. 18, 2023

(87) PCT Pub. No.: WO2022/176156
PCT Pub. Date: Aug. 25, 2022

(65) Prior Publication Data
US 2024/0187178 A1      Jun. 6, 2024

(51) Int. Cl.
H04L 5/00               (2006.01)
(52) U.S. Cl.
CPC .......... H04L 5/0051 (2013.01); H04L 5/0091 (2013.01)
(58) Field of Classification Search
CPC ............................ H04L 5/0051; H04L 5/0091
See application file for complete search history.

(56) References Cited

U.S. PATENT DOCUMENTS

| 11,569,954 | B2 * | 1/2023 | Zhang ................... | H04L 5/0051 |
| 11,924,015 | B2 * | 3/2024 | Khoshnevisan ...... | H04L 5/0048 |
| 2020/0007208 | A1 * | 1/2020 | Zhou .................... | H04B 7/0617 |
| 2020/0045569 | A1 * | 2/2020 | Seo ........................ | H04W 72/23 |
| 2020/0107353 | A1 * | 4/2020 | Jung .................... | H04W 72/23 |
| 2021/0028853 | A1 * | 1/2021 | Wu ....................... | H04B 7/0626 |
| 2021/0105166 | A1 * | 4/2021 | Khoshnevisan ........ | H04W 8/24 |
| 2021/0136739 | A1 * | 5/2021 | Chen .................... | H04L 5/0048 |
| 2021/0258895 | A1 * | 8/2021 | Sakhnini ................. | H04W 8/22 |
| 2022/0132430 | A1 * | 4/2022 | Hoshino ............. | H04W 52/143 |

(Continued)

OTHER PUBLICATIONS

International Search Report issued in PCT/JP2021/006328 on Oct. 5, 2021 (1 page).

(Continued)

*Primary Examiner* — Fahmida S Chowdhury
(74) *Attorney, Agent, or Firm* — Osha Bergman Watanabe & Burton LLP

(57)                ABSTRACT
A terminal according to one aspect of the present disclosure includes: a receiving section that receives a list of a plurality of serving cells or a plurality of bandwidth parts and receives configuration information of a plurality of transmission configuration indication (TCI) states applicable to a plurality of types of channels; and a control section that determines a reference signal of a first quasi-co-location (QCL) type and a reference signal of a second QCL type to be applied to the plurality of serving cells or the plurality of bandwidth parts, based on a restriction related to the reference signal of the first QCL type and the reference signal of the second QCL type for a demodulation reference signal (DMRS) and the configuration information. According to one aspect of the present disclosure, it is possible to appropriately perform TCI state indication.

7 Claims, 16 Drawing Sheets

(56)  References Cited

U.S. PATENT DOCUMENTS

| | | | | |
|---|---|---|---|---|
| 2022/0174704 | A1* | 6/2022 | Takano | H04B 7/088 |
| 2022/0201725 | A1* | 6/2022 | Liu | H04L 5/0053 |
| 2022/0393829 | A1* | 12/2022 | Kim | H04L 5/0094 |
| 2022/0407656 | A1* | 12/2022 | Matsumura | H04W 52/08 |
| 2023/0052764 | A1* | 2/2023 | Zhang | H04L 5/0048 |
| 2023/0345477 | A1* | 10/2023 | Zhang | H04L 5/0091 |
| 2024/0014935 | A1* | 1/2024 | Yuan | H04B 7/06952 |
| 2024/0187178 | A1* | 6/2024 | Matsumura | H04L 5/0091 |

OTHER PUBLICATIONS

Written Opinion of the International Searching Authority issued in PCT/JP2021/006328 on Oct. 5, 2021 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

FIG. 2A configuration for DL&UL (RRC)

Figures 2A, 2B:
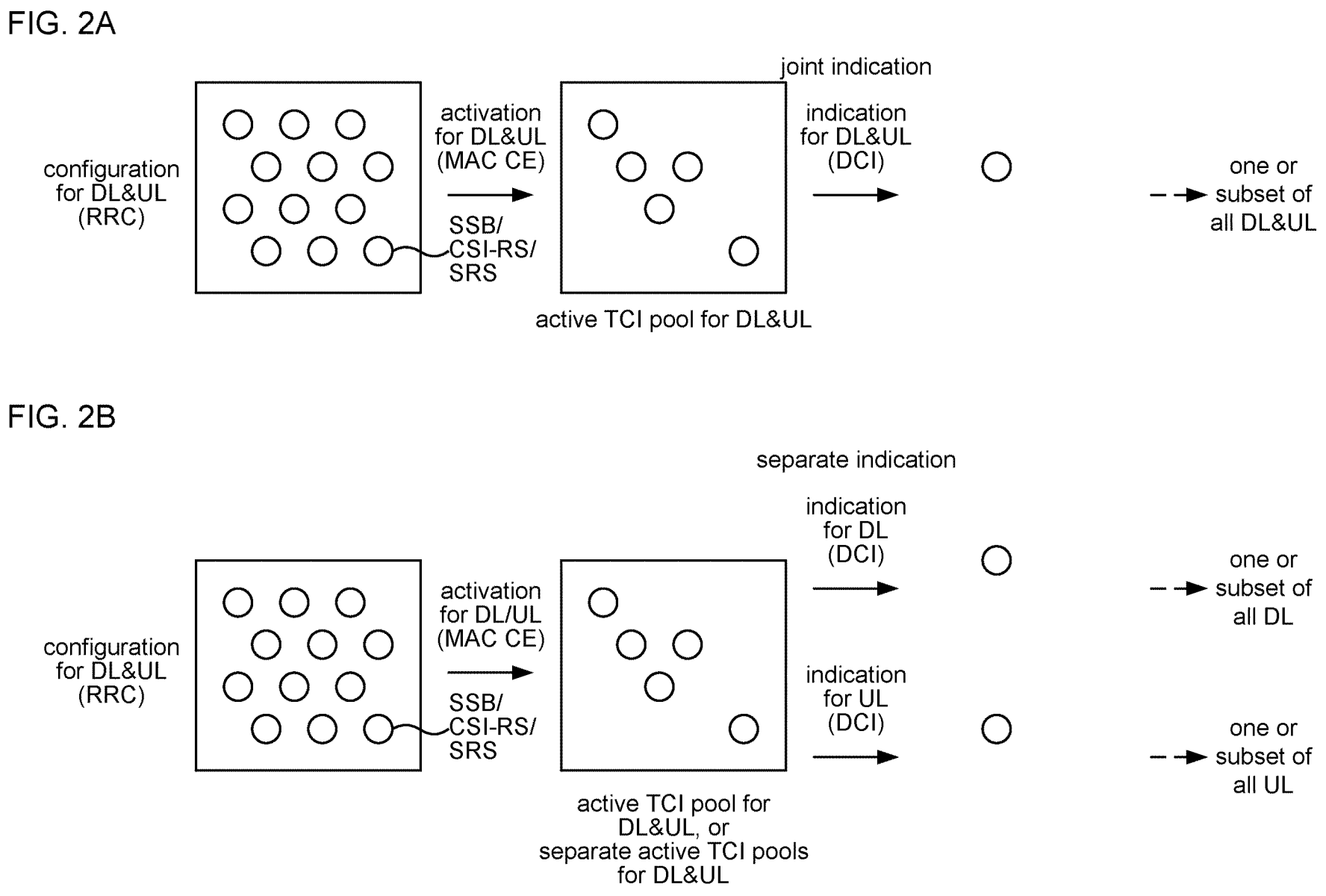

activation for DL&UL (MAC CE)

SSB/ CSI-RS/ SRS active TCI pool for DL&UL joint indication indication for DL&UL (DCI)

one or subset of all DL&UL

FIG. 2B configuration for DL&UL (RRC)

activation for DL/UL (MAC CE)

SSB/ CSI-RS/ SRS active TCI pool for DL&UL, or separate active TCI pools for DL&UL separate indication indication for DL (DCI)

indication for UL (DCI)

one or subset of all DL one or subset of all UL

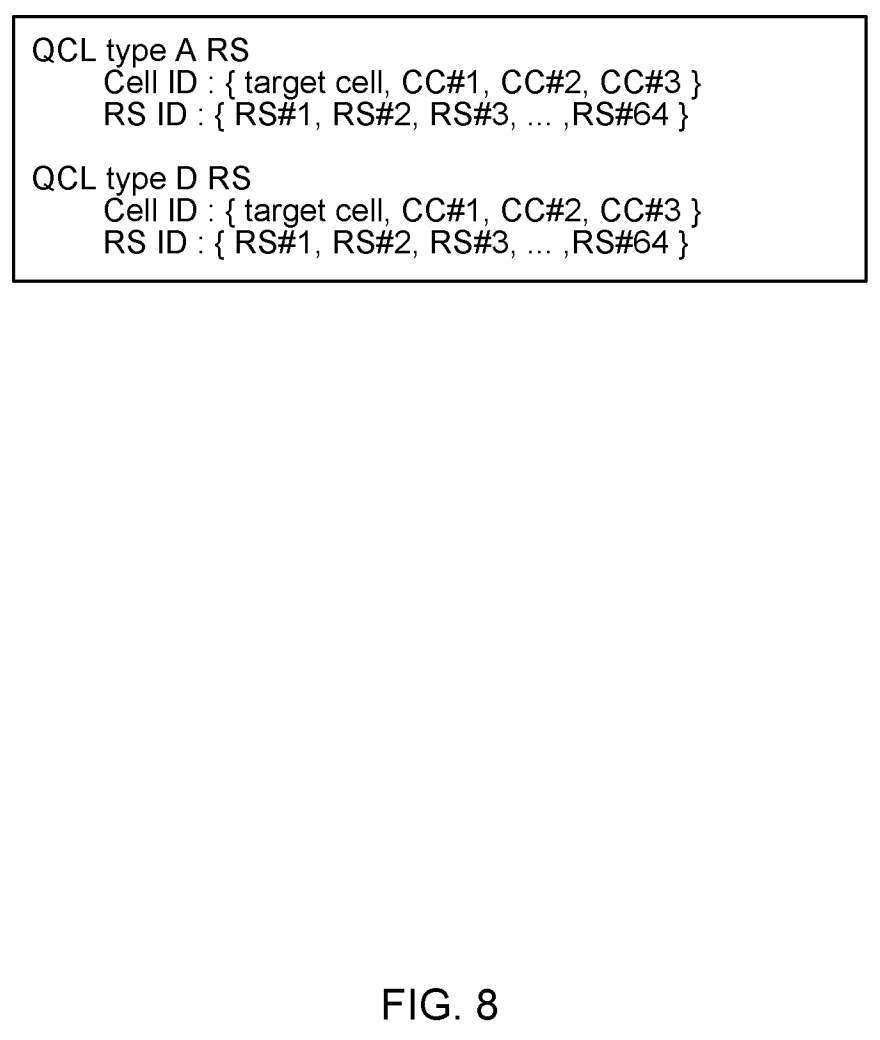

QCL type A RS
  Cell ID : {target cell, CC#1, CC#2, CC#3 }
  RS ID : {RS#1, RS#2, RS#3, ...,RS#64 }

QCL type D RS
  Cell ID : {target cell, CC#1, CC#2, CC#3 }
  RS ID : {RS#1, RS#2, RS#3, ...,RS#64 }

FIG. 8

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied that a user terminal (terminal, User Equipment (UE)) controls transmission/reception processing, based on information related to quasi-co-location (QCL) (QCL assumption/Transmission Configuration Indication (TCI) state/spatial relation).

Moreover, it is studied, for Rel. 17 (or later versions), to use a common TCI over at least one of a plurality of component carriers (CCs) and a plurality of bandwidth parts (BWPs).

However, a method of configuring and indicating a common beam (common TCI) for a plurality of CCs/BWPs has not been sufficiently studied. Unless this study is sufficient, degradation in communication quality, throughput reduction, and the like may occur.

Thus, an object of the present disclosure is to provide a terminal, a radio communication method, and a base station that can appropriately perform TCI state indication.

Solution to Problem

A terminal according to one aspect of the present disclosure includes: a receiving section that receives a list of a plurality of serving cells or a plurality of bandwidth parts and receives configuration information of a plurality of transmission configuration indication (TCI) states applicable to a plurality of types of channels; and a control section that determines a reference signal of a first quasi-co-location (QCL) type and a reference signal of a second QCL type to be applied to the plurality of serving cells or the plurality of bandwidth parts, based on a restriction related to the reference signal of the first QCL type and the reference signal of the second QCL type for a demodulation reference signal (DMRS) and the configuration information.

Advantageous Effects of Invention

According to one aspect of the present disclosure, it is possible to appropriately perform TCI state indication.

BRIEF DESCRIPTION OF DRAWINGS

FIGS. 2A and 2B are diagrams to show examples of a common beam.

FIG. 8 is a diagram to show an example of configuration information according to a third embodiment.

Figure 1:
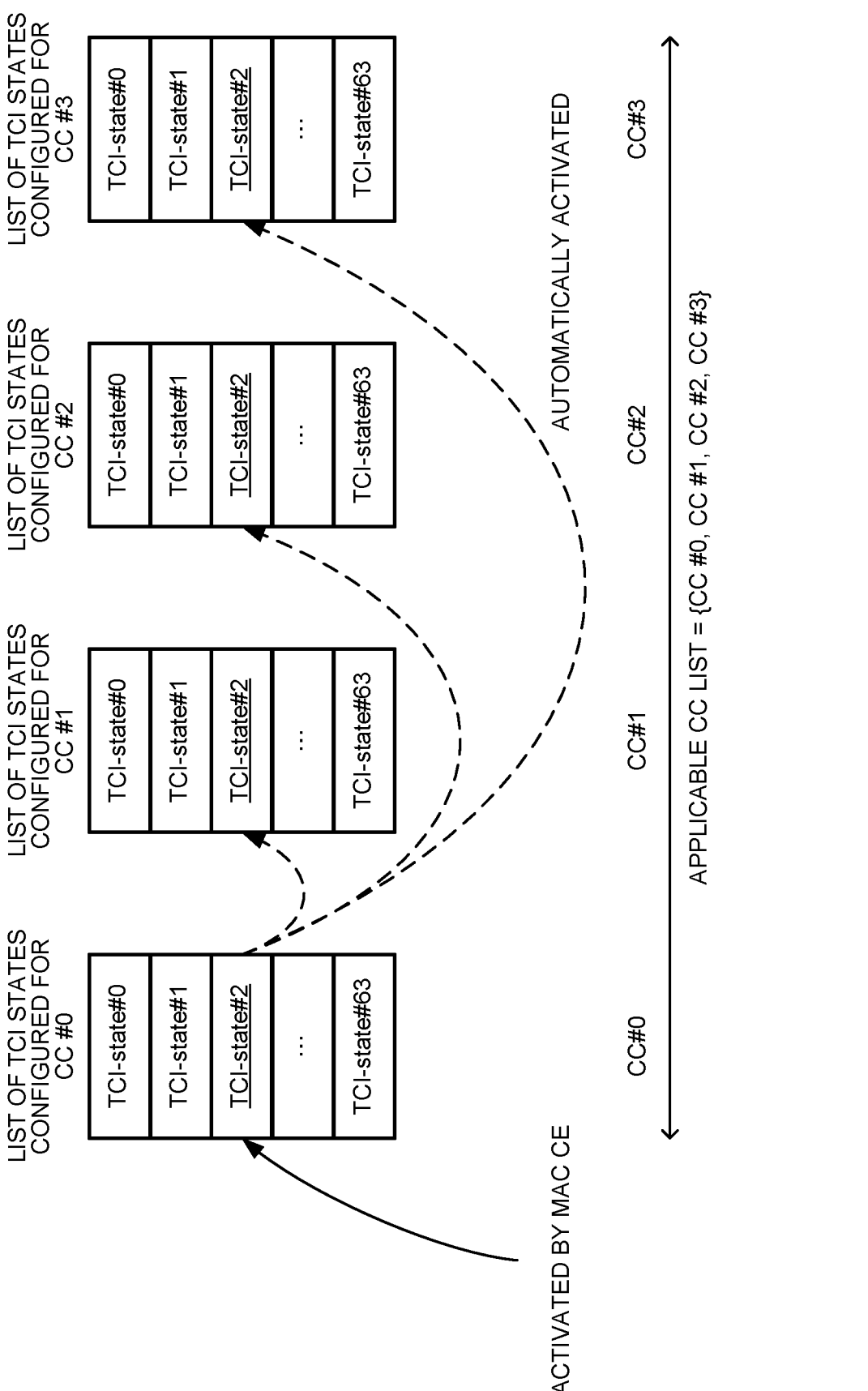
FIG. 1 is a diagram to show an example of simultaneous beam update over a plurality of CCs.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) in a UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have a different parameter(s) (or a parameter set(s)) that can be assumed to be the same, and such parameters (which may be referred to as QCL parameters) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

(Pathloss RS)

A pathloss $PL_{b,f,c}(q_d)$ [dB] in transmission power control of each of a PUSCH, a PUCCH, and an SRS is calculated by the UE by using an index $q_d$ of a reference signal (RS, pathloss reference RS (PathlossReferenceRS)) for downlink BWP associated with an active UL BWP b in a carrier f of a serving cell c. In the present disclosure, a pathloss reference RS, a pathloss (PL)-RS, an index $q_d$, an RS used for pathloss calculation, and an RS resource used for pathloss calculation may be interchangeably interpreted. In the present disclosure, calculation, estimation, measurement, and track may be interchangeably interpreted.

It is studied whether to change an existing mechanism of a higher layer filtered RSRP for pathloss measurement when the pathloss RS is updated by a MAC CE.

When the pathloss RS is updated by a MAC CE, pathloss measurement based on an L1-RSRP may be employed. At available timing after the MAC CE for updating the pathloss RS, the higher layer filtered RSRP may be used for pathloss measurement while an L1-RSRP may be used for pathloss measurement before the higher layer filtered RSRP is used. At available timing after the MAC CE for updating the pathloss RS, the higher layer filtered RSRP is used for pathloss measurement while a higher layered filtered RSRP of the previous pathloss RS may be used before the timing. Similarly to Rel-15 operation, a higher layer filtered RSRP may be used for pathloss measurement, and the UE may track all the pathloss RS candidates configured by RRC. The maximum number of pathloss RSs configurable by RRC may depend on UE capability. When the maximum number of pathloss RSs configurable by RRC is X, X or less pathloss RS candidates may be configured by RRC, and a pathloss RS may be selected by a MAC CE from among the configured pathloss RS candidates. The maximum number of pathloss RSs configurable by RRC may be 4, 8, 16, 64, and the like.

In the present disclosure, a higher layer filtered RSRP, a filtered RSRP, and a layer 3 filtered RSRP may be interchangeably interpreted.

(Default TCI State/Default Spatial Relation/Default PL-RS)

In an RRC connected mode, in both a case where information of TCI in DCI (higher layer parameter TCI-PresentInDCI) is set as "enabled" and a case where the information of TCI in DCI is not configured, when a time offset between reception of DL DCI (DCI for scheduling a PDSCH) and the corresponding PDSCH (PDSCH scheduled by the DCI) is less than a threshold (timeDurationForQCL) (application condition, first condition), the TCI state (default TCI state) of a PDSCH may be the TCI state corresponding to the lowest CORESET ID in the latest slot in an active DL BWP in the CC (of a particular UL signal) if non-cross carrier scheduling is performed. Otherwise, the TCI state (default TCI state) of the PDSCH may be the TCI state of the lowest TCI state ID of the PDSCHs in the active DL BWP in a scheduled CC.

In Rel. 15, separate MAC CEs, specifically, a MAC CE for activation/deactivation of a PUCCH spatial relation and a MAC CE for activation/deactivation of an SRS spatial relation, are needed. The PUSCH spatial relation follows the SRS spatial relation.

In Rel. 16, at least one of a MAC CE for activation/ deactivation of a PUCCH spatial relation and a MAC CE for activation/deactivation of an SRS spatial relation need not necessarily be used.

If neither a spatial relation nor a PL-RS for a PUCCH is configured in FR2 (application condition, second condition), default assumptions of a spatial relation and a PL-RS (default spatial relation and default PL-RS) are used for the PUCCH. If neither a spatial relation nor a PL-RS for an SRS (SRS resource for the SRS or SRS resource corresponding to an SRI in DCI format 0_1 for scheduling a PUSCH) is configured in FR2 (application condition, second condition), the default assumptions of a spatial relation and a PL-RS (default spatial relation and default PL-RS) are used for the PUSCH scheduled by DCI format 0_1 and the SRS.

If a CORESET is configured in the active DL BWP in the CC (application condition), the default spatial relation and the default PL-RS may be the TCI state or the QCL assumption of the CORESET having the lowest CORESET ID in the active DL BWP. If no CORESET is configured in the active DL BWP in the CC, the default spatial relation and the default PL-RS may be the active TCI state having the lowest ID of the PDSCHs in the active DL BWP.

In Rel. 15, the spatial relation of a PUSCH scheduled in DCI format 0_0 follows the spatial relation of the PUCCH resource having the lowest PUCCH resource ID among active spatial relations of the PUCCHs in the same CC. Even when no PUCCH is transmitted in an SCell, a network need update all the PUCCH spatial relations in the SCell.

In Rel. 16, no PUCCH configuration for a PUSCH scheduled by DCI format 0_0 is needed. When no active PUCCH spatial relation is present or no PUCCH resource is present for a PUSCH scheduled by DCI format 0_0 in the active UL BWP in the CC (application condition, second condition), the default spatial relation and the default PL-RS are used for the PUSCH.

An application condition of a default spatial relation/ default PL-RS for SRS may include an enable default beam pathloss for SRS information element (higher layer parameter enableDefaultBeamPlForSRS) is set as enabled. An application condition of a default spatial relation/default PL-RS for PUCCH may include an enable default beam pathloss for PUCCH information element (higher layer parameter enableDefaultBeamPlForPUCCH) is set as enabled. An application condition of a default spatial relation/default PL-RS for PUSCH scheduled by DCI format 0_0 may include an enable default beam pathloss for PUSCH scheduled by DCI format 0_0 information element (higher layer parameter enableDefaultBeamPlFor-PUSCH0_0) is set as enabled.

The threshold may be referred to as time duration for QCL, "timeDurationForQCL," "Threshold," "Threshold for offset between a DCI indicating a TCI state and a PDSCH scheduled by the DCI," "Threshold-Sched-Offset," a schedule offset threshold, a scheduling offset threshold, and the like.

(Multi-TRP)

For NR, it is studied that one or a plurality of transmission/reception points (TRPs) (multi-TRP (multi TRP (MTRP))) perform DL transmission to a UE by using one or a plurality of panels (multi-panel). It is also studied that the UE performs UL transmission to the one or plurality of TRPs by using one or a plurality of panels.

Note that the plurality of TRPs may correspond to the same cell identifier (ID) or may correspond to different cell IDs. The cell ID may be a physical cell ID or a virtual cell ID.

The multi-TRP (for example, TRPs #1 and #2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be employed.

In NCJT, for example, TRP #1 performs modulation mapping on a first codeword, performs layer mapping, and transmits a first PDSCH in layers of a first number (for example, two layers) by using first precoding. TRP #2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

A plurality of PDSCHs (which may be referred to as multi-PDSCH (multiple PDSCHs)) from the multi-TRP may be scheduled by using one piece of DCI (single DCI, single PDCCH) (single master mode, multi-TRP based on single DCI (single-DCI based multi-TRP)).

The plurality of PDSCHs from the multi-TRP may be separately scheduled by using a plurality of pieces of DCI (multi-DCI, multi-PDCCH (multiple PDCCHs)) (multi-master mode, multi-TRP based on multi-DCI (multi-DCI based multi-TRP)).

For URLLC for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC schemes, for example, schemes 1, 2a, 2b, 3, and 4). In scheme 1, multi-PDSCH from multi-TRP is space division multiplexed (SDMed). In schemes 2a and 2b, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a channel with high quality is possible.

To support intra-cell (with the same cell ID) and inter-cell (with different cell IDs) multi-TRP transmission based on a plurality of PDCCHs, one control resource set (CORESET) in PDCCH configuration information (PDCCH-Config) may correspond to one TRP in RRC configuration information for linking a plurality of pairs of a PDCCH and a PDSCH with a plurality of TRPs.

When at least one of conditions 1 and 2 below is satisfied, the UE may determine that it is multi-TRP based on multi-DCI. In this case, a TRP may be interpreted as a CORESET pool index.

{Condition 1}

One CORESET pool index is configured.

{Condition 2}

Two different values (for example 0 and 1) of a CORE-SET pool index are configured.

When the following condition is satisfied, the UE may determine that it is multi-TRP based on single DCI. In this case, two TRPs may be interpreted as two TCI states indicated by a MAC CE/DCI.

{Condition}

To indicate one or two TCI states for one codepoint of a TCI field in DCI, an "enhanced TCI states activation/deactivation for UE-specific PDSCH MAC CE" is used.

DCI for common beam indication may be a UE-specific DCI format (for example, DL DCI format (for example, 1_1, 1_2)), may be a UL DCI format (for example, 0_1, 0_2), or may be a UE-group common DCI format.

(Simultaneous Beam Update of Plurality of CCs)

In Rel. 16, one MAC CE can update beam indices (TCI states) of a plurality of CCs.

The UE can be configured with up to two applicable CC lists (for example, applicable-CC-list) by RRC. When two applicable CC lists are configured, the two applicable CC lists may correspond to inter-band CA in FR1 and inter-band CA in FR2.

An activation MAC CE for a TCI state of a PDCCH activates TCI states associated with the same CORESET ID in all the BWPs/CCs in an applicable CC list.

An activation MAC CE for a TCI state of a PDSCH activates TCI states in all the BWPs/CCs in the applicable CC list.

An activation MAC CE for a spatial relation of an A-SRS/SP-SRS activates spatial relations associated with the same SRS resource ID in all the BWPs/CCs in the applicable CC list.

In the example in FIG. 1, the UE is configured with an applicable CC list indicating CCs #0, #1, #2, and #3 and a list indicating 64 TCI states for a CORESET or a PDSCH in each of the CCs. When one TCI state in CC #0 is activated by a MAC CE, corresponding TCI states are activated in CCs #1, #2, and #3.

It is studied that such simultaneous beam update is applicable only to a single-TRP case.

For a PDSCH, the UE may be based on Procedure A below.

{Procedure A}

The UE receives an activation command for mapping up to eight TCI states to a codepoint in a DCI field (TCI field) in one CC/DL BWP or in one set of CCs/BWPs. When one set of TCI state IDs is activated for one set of CCs/DL BWPs, an applicable CC list is determined by a CC(s) indicated in an activation command, and a set of TCI states being the same is applied to all the DL BWPs in the indicated CC. Only if the UE is not provided with a plurality of different values of CORESET pool indices (CORESET-PoolIndex) in a CORESET information element (Control-ResourceSet) and is not provided with at least one TCI codepoint mapped to two TCI states, the one set of TCI state IDs can be activated for one set of CCs/DL BWPs.

For a PDCCH, the UE may be based on Procedure B below.

{Procedure B}

If the UE is provided with up to two lists of cells for simultaneous TCI state activation by a simultaneous TCI update list (at least one of simultaneousTCI-UpdateList-r16 and simultaneousTCI-UpdateListSecond-r16), by a simultaneous TCI cell list (simultaneousTCI-CellList), the UE applies, to CORESETs with an index p in all the configured DL BWPs in all the configured cells in one list determined based on a serving cell index provided by a MAC CE command, an antenna port quasi co-location (QCL) provided by TCI states with the same activated TCI state ID value. Only if the UE is not provided with a plurality of different values of CORESET pool indices (CORESET-PoolIndex) in a CORESET information element (Control-ResourceSet) and is not provided with at least one TCI codepoint mapped to two TCI states, the UE can be provided with a simultaneous TCI cell list for simultaneous TCI state activation.

For a semi-persistent (SP)/aperiodic (AP)-SRS, the UE may be based on Procedure C below.

{Procedure C}

When an SP configured by an SRS resource information element (higher layer parameter SRS-Resource) or spatial relation information (spatialRelationInfo) for an AP-SRS resource is activated/updated by a MAC CE for one set of CCs/BWPs, an applicable CC list is indicated by a simultaneous spatial update list (higher layer parameter smiultaneousSpatial-UpdateList-r16 or simultaneousSpatial-UpdateListSecond-r16), and the spatial relation information is applied to SPs or AP-SRS resources with the same SRS resource ID in all the BWPs in the indicated CC. Only if the UE is not provided with a plurality of different values of CORESET pool indices (CORESETPoolIndex) in a CORE-SET information element (ControlResourceSet) and is not provided with at least one TCI codepoint mapped to two TCI states, the SP configured by the SRS resource information element (higher layer parameter SRS-Resource) or spatial relation information (spatialRelationInfo) for the AP-SRS resource is activated/updated by an MAC CE for the one set of CCs/BWPs.

The simultaneous TCI cell list (simultaneousTCI-Cell-List) and simultaneous TCI update lists (at least one of simultaneousTCI-UpdateList1-r16 and simultaneousTCI-UpdateList2-r16) are lists of serving cells for which a TCI relationship can be updated simultaneously by using a MAC CE. simultaneousTCI-UpdateList1-r16 and simultaneousTCI-UpdateList2-r16 do not include the same serving cell.

The simultaneous spatial update list (at least one of higher layer parameters simultaneousSpatial-UpdatedList1-r16 and simultaneousSpatial-UpdatedList2-r16) is a list of serving cells for which a spatial relationship can be updated simultaneously by using a MAC CE. simultaneousSpatial-UpdatedList1-r16 and simultaneousSpatial-UpdatedList2-r16 do not include the same serving cell.

Here, the simultaneous TCI update lists and the simultaneous spatial update lists are configured by RRC, a CORE-SET pool index of a CORESET is configured by RRC, and a TCI codepoint mapped to TCI state(s) is indicated by a MAC CE.

(Unified/Common TCI Framework)

With a unified TCI framework, UL and DL channels can be controlled by a common framework. A unified TCI framework may indicate a common beam (common TCI state) and apply the common beam to all the UL and DL channels instead of defining a TCI state or a spatial relation for each channel as in Rel. 15, or apply a common beam for UL to all the UL channels while applying a common beam for DL to all the DL channels.

One common beam for both DL and UL or a common beam for DL and a common beam for UL (two common beams in total) are studied.

The UE may assume the same TCI state (joint TCI state, joint TCI pool, joint common TCI pool) for UL and DL. The UE may assume respective different TCI states (separate TCI states, separate TCI pools, UL separate TCI pool and DL separate TCI pool, separate common TCI pools, UL common TCI pool and DL common TCI pool) for UL and DL.

By beam management based on a MAC CE (MAC CE level beam indication), default UL and DL beams may be aligned. A default TCI state of a PDSCH may be updated to match to a default UL beam (spatial relation).

By beam management based on DCI (DCI level beam indication), a common beam/unified TCI state may be indicated from the same TCI pool (joint common TCI pool, joint TCI pool, set) for both UL and DL. M (>1) TCI states may be activated by a MAC CE. UL/DL DCI may select one from the M active TCI states. The selected TCI state may be applied to channels/RSs of both UL and DL.

The TCI pool (set) may be a plurality of TCI states configured by an RRC parameter or a plurality of TCI states (active TCI states, active TCI pool, set) activated by a MAC CE among the plurality of TCI states configured by the RRC parameter. Each TCI state may be a QCL type A/D RS. As the QCL type A/D RS, an SSB, a CSI-RS, or an SRS may be configured.

In the example in FIG. 2A, an RRC parameter (information element) configures a plurality of TCI states for both DL and UL. The MAC CE may activate a plurality of TCI states among the plurality of configured TCI states. DCI may indicate one of the plurality of activated TCI states. The DCI may be UL/DL DCI. The indicated TCI state may be applied to at least one (or all) of UL/DL channels/RSs. One piece of DCI may indicate both a UL TCI and a DL TCI.

In the example in FIG. 2A, one dot may be one TCI state applied to both UL and DL or may be two respective TCI states applied to UL and DL.

At least one of the plurality of TCI states configured by the RRC parameter and the plurality of TCI states activated by the MAC CE may be referred to as a TCI pool (common TCI pool, joint TCI pool, TCI state pool). The plurality of TCI states activated by the MAC CE may be referred to as an active TCI pool (active common TCI pool).

Note that, in the present disclosure, a higher layer parameter (RRC parameter) that configures a plurality of TCI states may be referred to as configuration information that configures a plurality of TCI states or simply as "configuration information." In the present disclosure, one of a plurality of TCI states being indicated by using DCI may be receiving indication information indicating one of a plurality of TCI states included in DCI or may simply be receiving "indication information."

In the example in FIG. 2B, an RRC parameter configures a plurality of TCI states for both DL and UL (joint common TCI pool). A MAC CE may activate a plurality of TCI states (active TCI pool) among the plurality of configured TCI states. Respective (different, separate) active TCI pools for UL and DL may be configured/activated.

DL DCI or a new DCI format may select (indicate) one or more (for example, one) TCI states. The selected TCI state(s) may be applied to one or more (or all) DL channels/RSs. The DL channel(s) may be a PDCCH/PDSCH/CSI-RS(s). The UE may determine the TCI state of each of the DL channels/RSs by using operation of a TCI state (TCI framework) of Rel. 16. UL DCI or a new DCI format may select (indicate) one or more (for example, one) TCI states. The selected TCI state(s) may be applied to one or more (or all) UL channels/RSs. The UL channel(s) may be a PUSCH/

SRS/PUCCH(s). Thus, different pieces of DCI may indicate a UL TCI and a DL TCI separately.

Existing DCI format 1_2/1_2 may be used for indication of a common TCI state.

A common TCI framework may include separate TCI states for DL and UL.

A common TCI framework may include separate TCI states for DL and UL. It is not preferable to indicate a common TCI state of only UL by using DCI format 1_1/1_2.
(Unified TCI Framework in Carrier Aggregation (CA))

For NR in Rel. 17 (later versions), it is studied to introduce a unified TCI state framework in CA. A common TCI state indicated to the UE is expected to be common to CCs (cells) (at least QCL type D between CCs). This is due to that simultaneous reception of DL channels/RSs of different types of QCL type D and simultaneous transmission of UL channels/RSs of different spatial relations are not supported in existing specifications (Rel. 15/16) except for a case of transmission/reception using a plurality of TRPs and the like.

However, when indication of a beam is performed for each CC by an individual MAC CE/DCI, signaling overhead may increase.

In addition, update/activation of a common TCI state ID is studied for provision of common QCL information/common UL transmission spatial filter over a set of a plurality of configured CCs in the unified TCI framework.

As a TCI state pool for CA, options 1 and 2 below are studied.
{Option 1}

A single TCI state pool configured by RRC may be shared by (configured for) a set of a plurality of configured CCs (cells)/BWPs. For example, a cell group TCI state may be defined, or a TCI state pool for PDSCHs in a reference cell may be reused. With no CC (cell) ID for a QCL type A RS in a TCI state, a CC (cell) ID for a QCL type A RS may be determined according to a target CC (cell) in a TCI state.

In Option 1, a common TCI state pool is configured for every plurality of CCs/BWPs. Hence, when one common TCI state is indicated by a MAC CE/DCI, the indicated common TCI state may be applied to all the CCs/BWPs (all the CCs/BWPs included in a CC/BWP list configured in advance).
{Option 2}

A TCI state pool may be configured by RRC for each individual CC.

In Option 2, as in Rel. 16, a CC/BWP application list for simultaneous beam update may be configured by RRC in advance, and when beam update is performed by a MAC CE/DCI in one of the CCs/BWPs included in the CC/BWP list, the update may be applied to all the CCs/BWPs.

In Option 1, a common TCI state pool is configured for (shared by) a plurality of CCs by RRC, a TCI state in the common TCI state pool is indicated by a common TCI state ID, and one RS determined based on the TCI state is used to indicate QCL type D over a plurality of configured CCs/a set of the plurality of configured CCs (Restriction 1).

In Option 2, a common TCI state pool is individually configured for each CC by RRC, a TCI state in the common TCI state pool is indicated by a common TCI state ID, and one RS determined based on the TCI state is used to indicate QCL type D over a plurality of configured Ccs/a set of the plurality of configured CCs (Restriction 2).
(Restriction of QCL Configuration)

As described above, it is studied to control beams of a plurality of types of channels by a common beam indication/ activation (MAC CE/DCI) in the common TCI framework, and this control is performed for one CC (cell).

Simultaneous beam update over a plurality of CCs formalized as a specification in Rel. 16 can update beams of a plurality of BWPs/CCs by one MAC CE beam indication and can hence reduce overhead in beam control.

In Rel. 15/16, QCL source RSs (type A RS and type D RS) configured in a TCI state of a DMRS for PDCCH/DMRS for PDSCH are limited to cases (Case 1) to (Case 3) below:

(Case 1) the type A RS is a tracking reference signal (TRS) (CSI-RS configured with a higher layer parameter trs-Info), and the type D RS is a CSI-RS equal to that of the type A RS, (Case 2) the type A RS is a TRS, and the type D RS is a CSI-RS configured with a higher layer parameter "repetition", and (Case 3) the type A RS is a CSI-RS not configured with the higher layer parameter trs-Info and not configured with the higher layer parameter "repetition", and the type D RS is a CSI-RS equal to that of the type A RS.

Hence, a case where the type A RS and the type D RS have different CSI-RS resources is only (Case 2) above.

A CSI-RS configured with the higher layer parameter "repetition" may be configured to support reception beam determination of the UE. However, reception beam determination of the UE can be performed without using the CSI-RS configured with the higher layer parameter "repetition."

Meanwhile, since a network (NW, for example, a base station) transmits a TRS as the type A RS, use of (Case 1) above using the TRS as the type D RS is considered to be general.

Also in the common TCI framework, it is preferable to enable simultaneous beam update over a plurality of CCs. However, a configuration of QCL between a DMRS for PDCCH/DMRS for PDSCH and a TRS in a plurality of CCs have restrictions as follows.

Figure 3:
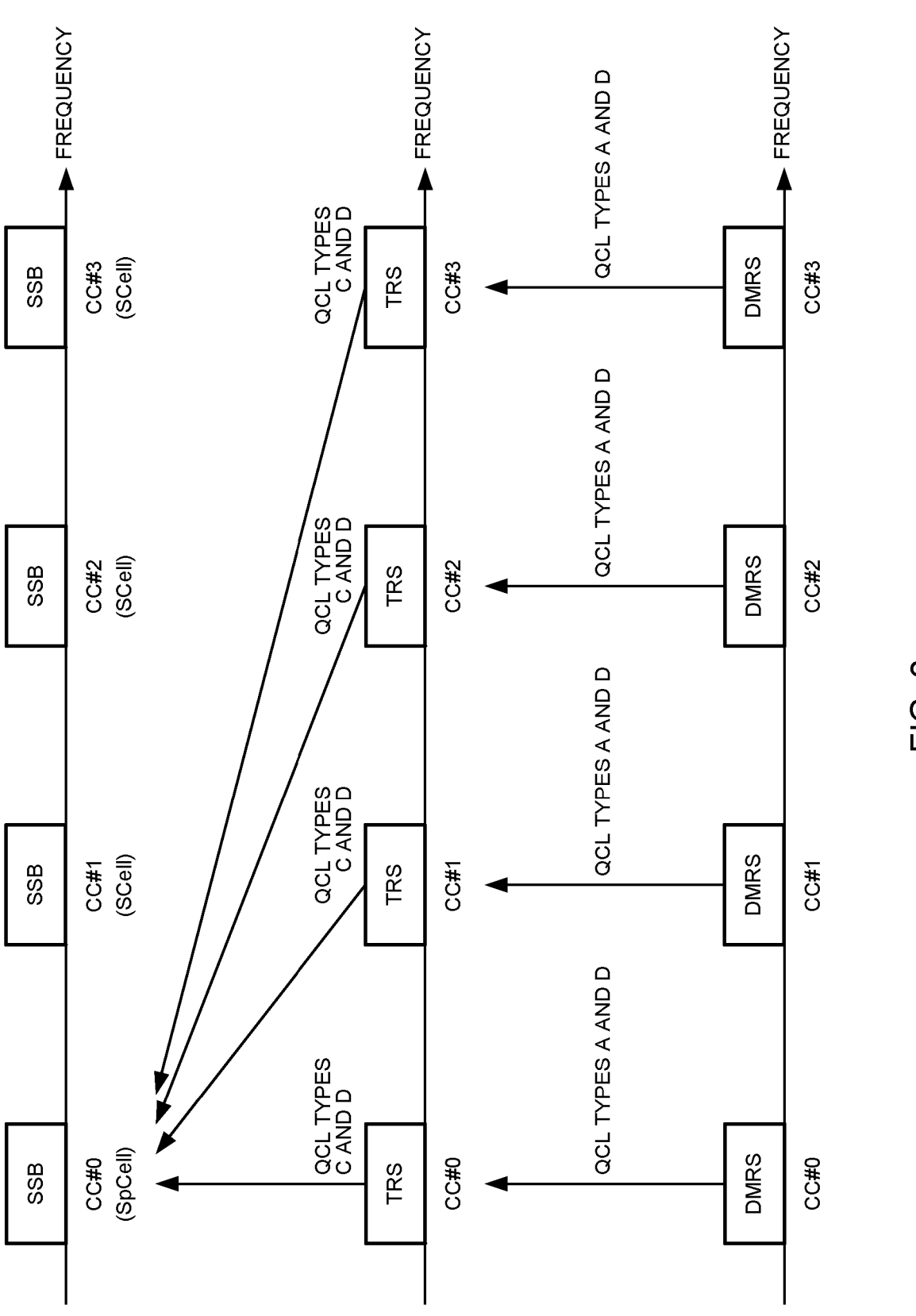
FIG. 3 is a diagram to show examples of a configurable QCL configuration.

For example, such a configuration as that shown in FIG. 3 is possible. Assume that CC #0 being a special cell (SpCell) (primary cell (PCell) or primary secondary cell (PSCell)) and CCs #1, #2, and #3 being SCells are configured, and that an SSB, TRS, DMRS for PDCCH/DMRS for PDSCH (which may be referred to simply as a DMRS) is transmitted in each CC. In this case, a TRS of each CC is in a relationship of QCL type C and QCL type D with the SSB of CC #0, and a PDCCH of each CC is in a relationship of QCL type A and QCL type D with the TRS of the same CC.

Figure 4:
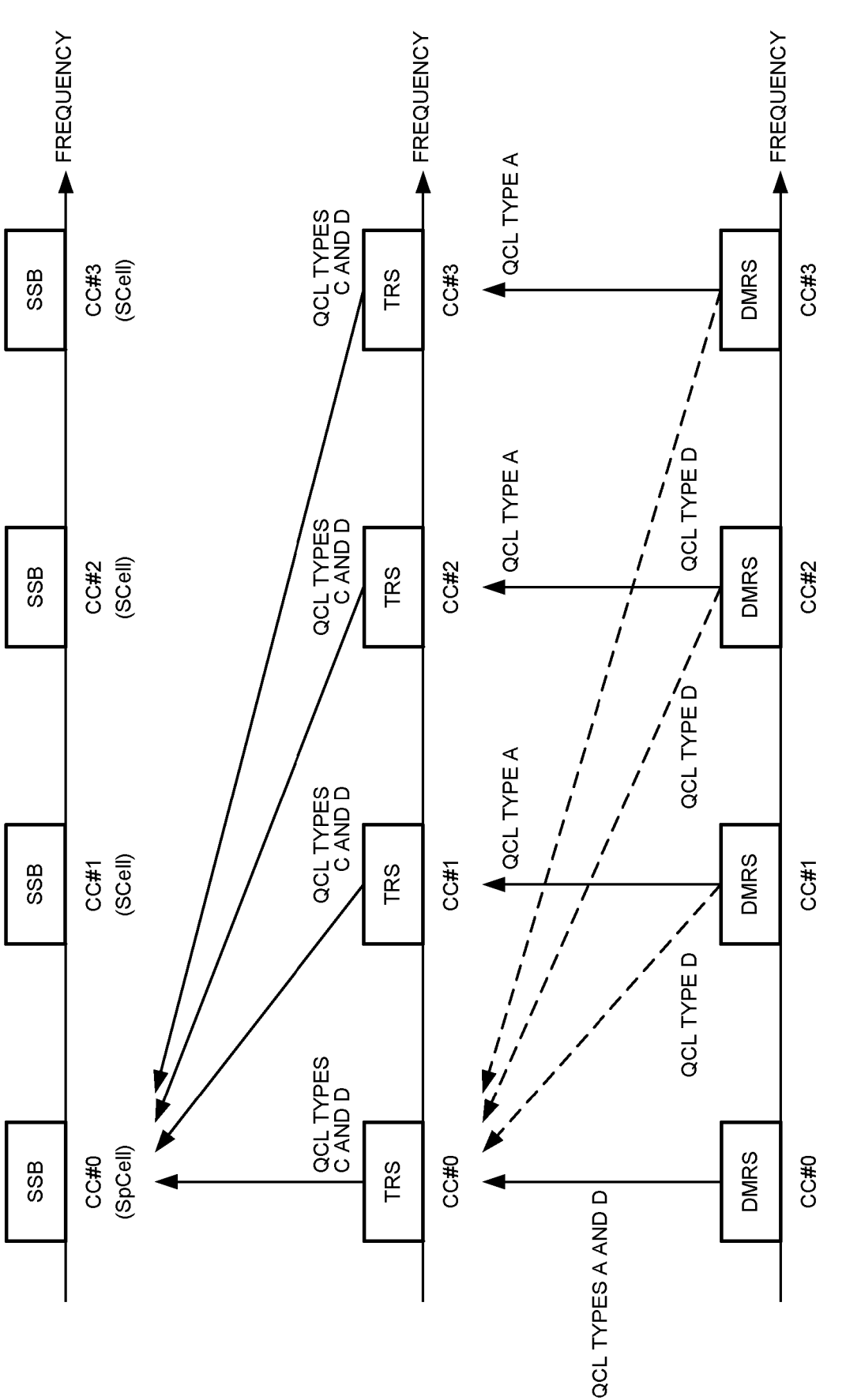
FIG. 4 is a diagram to show examples of a non-configurable QCL configuration.

For example, such a configuration as that shown in FIG. 4 is not possible. Similarly to FIG. 3 described above, the TRS of each CC is in a relationship of QCL type C and QCL type D with the SSB of CC #0, and when the DMRS of each CC is in a relationship of QCL type A with the TRS of the same CC, the DMRSs of CCs #1, 2, and 3 cannot be in a relationship of QCL type D with the TRS of CC #0 (illustrated by a dashed line). When the TCI state of the DMRS for PDCCH/DMRS for PDSCH is a TRS, an RS of QCL type A and an RS of QCL type D need be the same TRS.

When a TRS is configured as a QCL type A/D RS in the TCI state of a certain CC, the TRS of another CC cannot be configured as the QCL type A/D RS. Hence, also when a common TCI pool or common TCI is configured/updated/indicated for a plurality of CCs, configuration of a TCI state (TCI state including a QCL type A/D RS) is performed for each CC.

When a CSI-RS is configured as a QCL type D RS in the TCI state of a certain CC, the CSI-RS of another CC can be configured as the QCL type D RS in the TCI state of a PDCCH/PDSCH of the certain CC in some cases. Also in this case, the CSI-RS/TRS of the same CC need be configured as the QCL type A RS in the TCI state. This is because the QCL type A RS indicates that the same parameter for determining channel properties such as a delay spread, average delay, or the like is used, the values of the parameter may be different from each other in different CCs.

The cell of the QCL type A RS need be the same as the cell of the DMRS for PDSCH/PDCCH configured with the TCI state.

As described above, when the QCL type D RS is a TRS, the QCL type D RS need be the same as the QCL type A RS. By combining the above description, when the QCL type D RS is a TRS, the cell of the QCL type D RS need be the same cell of the DMRS for PDSCH/PDCCH configured with the TCI state.

When the QCL type D RS is a CSI-RS configured with repetition (with a CSI-RS resource in an NZP CSI-RS resource set configured with the higher layer parameter "repetition" (higher layer parameter "repetition" being ON)), the cell of the QCL type D RS may be different from the cell of the DMRS for PDSCH/PDCCH configured with the TCI state.

In consideration of Restriction 1 and Restriction 2 described above, among QCL source RSs in a common TCI state, a QCL type A RS is a TRS of each CC (CC of a DMRS to which the common TCI state is applied), and a QCL type D RS is a TRS of one CC. This indicates that operation is only possible in Case 2 of the QCL configuration restrictions described above (Issue 1).

In the unified TCI state framework in CA, a TCI state is indicated by a MAC CE/DCI, and the indicated TCI state is applied to a plurality of CCs/BWPs. Hence, application of the TCI state indicated by DCI of a certain CC/BWP to a plurality of CCs/BWPs may increase complexity of UE operation (Issue 2).

Figure 5:
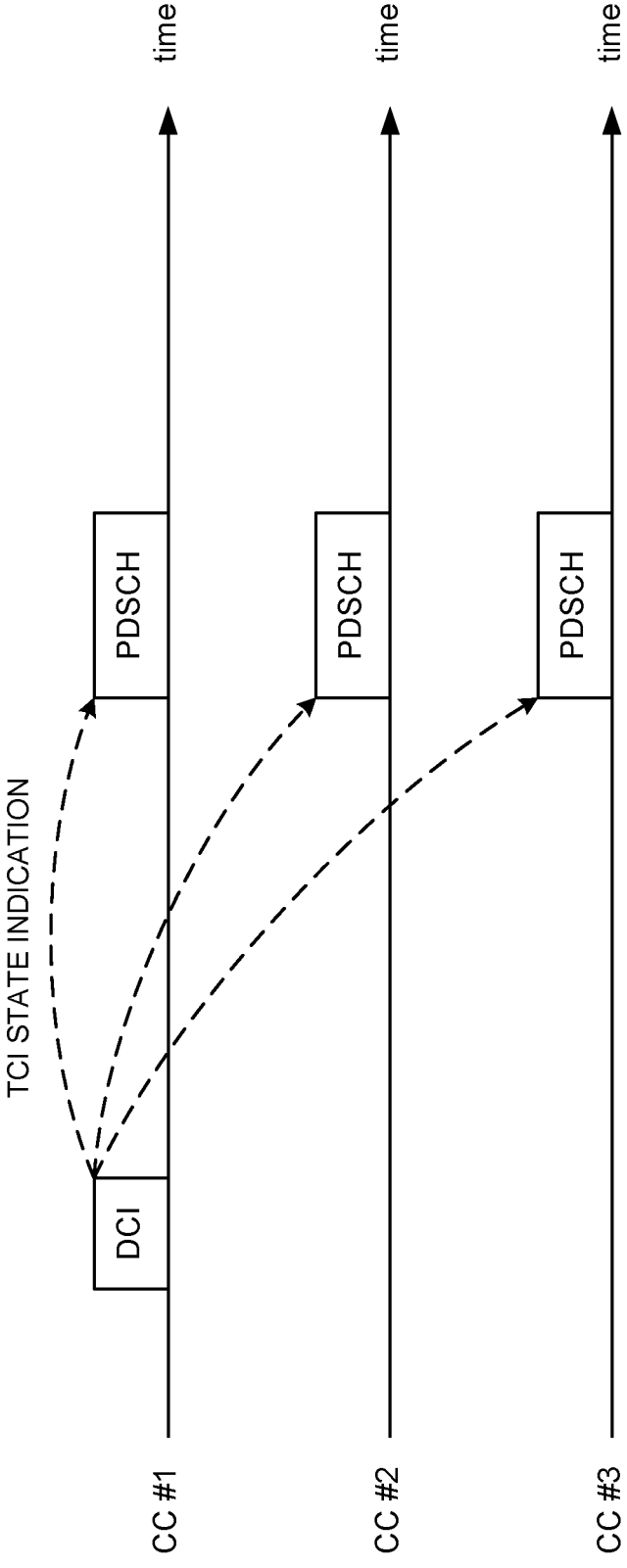
FIG. 5 is a diagram to show an example of TCI state indications in a unified TCI state framework in CA.

Furthermore, FIG. 5 is a diagram to show an example of TCI state indication in the unified TCI state framework in CA. In the example shown in FIG. 5, the UE receives a TCI state indication for a PDSCH in each of CCs #1 to #3, in CC #1. DCI of a certain CC thus affecting transmission/reception of a channel/signal of another CC results in requesting support for operation similar to cross carrier scheduling, which may increase complexity of the UE. More concretely, in the example in FIG. 5, since the indication to CCs #2 and #3 in DCI of CC #1 is a DCI indication over the CCs, it is considered that processing time and implementation cost increase in the UE.

As described above, a method of configuring/indicating timing from an indication of a beam (for example, a unified TCI state) using (based on) DCI to application of a TCI state, from the NW to the UE is not studied sufficiently. Concretely, whether and how the start and end of the timing are determined is not studied sufficiently. Unless this study is sufficient, degradation in communication quality, throughput reduction, and the like may occur (Issue 3).

Thus, the inventors of the present invention came up with the idea of a method of configuration and indication related to a common beam (common TCI) over a plurality of BWPs/CCs that solves Issues 1 to 3 above.

Embodiments according to the present disclosure will be described in detail with reference to the drawings as follows. The radio communication methods according to respective embodiments may each be employed individually, or may be employed in combination. Note that embodiments to solve Issues 1 and 2 above are described in first to fifth embodiments, and an embodiment to solve Issue 3 is described in a sixth embodiment. However, the embodiments in the disclosure may be applied in combination.

Note that, in the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, a MAC CE and an activation/deactivation command may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

UL DCI, DCI scheduling a UL channel (for example, a PUSCH), and DCI format 0_x (x=0, 1, 2, . . . ) may be interchangeably interpreted. DL DCI, DCI scheduling a DL channel (PDSCH), and DCI format 1_x (x=0, 1, 2, . . . ) may be interchangeably interpreted.

In the present disclosure, HARQ-ACK information, ACK, and NACK may be interchangeably interpreted.

In the present disclosure, a link direction, downlink (DL), uplink (UL), and at least one of UL and DL may be interchangeably interpreted.

In the present disclosure, a pool, a set, a group, a list, and candidates may be interchangeably interpreted.

In the present disclosure, a common beam, a common TCI, a common TCI state, a unified TCI, a unified TCI state, a TCI state applicable to DL and UL, a TCI state applied to a plurality of (plurality of types of) channels/RSs, a TCI state applicable to a plurality of types of channels/RSs, and a PL-RS may be interchangeably interpreted.

In the present disclosure, a plurality of TCI states configured by RRC, a plurality of TCI states activated by a MAC CE, a pool, a TCI state pool, an active TCI state pool, a common TCI state pool, a joint TCI state pool, a separate TCI state pool, a common TCI state pool for UL, a common TCI state pool for DL, a common TCI state pool configured/activated by RRC/MAC CE, and TCI state information may be interchangeably interpreted.

In the present disclosure, a beam, a spatial domain filter, spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, an Uplink (UL) transmission entity, a point, a TRP, a spatial relation, a control resource set (CORESET), a PDSCH, a codeword, a base station, an antenna port for a certain signal (for example, a demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CORESET subset, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP index, a TRP ID, a CORESET pool index, the ordinal number (first, second) of a TCI of two TCI states, and a TRP may be interchangeably interpreted.

In the present disclosure, a CC list, a serving cell list, a CC list in a cell group configuration (CellGroupConfig), an applicable list, a simultaneous TCI update list/second simultaneous TCI update list, simultaneousTCI-UpdateList1-r16/simultaneousTCI-UpdateList2-r16, a simultaneous TCI cell list, simultaneousTCI-CellList, a simultaneous spatial update list/second simultaneous spatial update list, simultaneousSpatial-UpdatedList1-r16/simultaneousSpatial-UpdatedList2-r16, a configured CC, a configured list, a BWP/CC in a configured list, all the BWPs/CCs in a configured list, a CC indicated by an activation command, an indicated CC, a CC in which a MAC CE is received, and information indicating a plurality of cells for update of at least one of a TCI state and a spatial relation may be interchangeably interpreted.

(Radio Communication Method)

In the present disclosure, a DL TCI, a DL common TCI, a DL unified TCI, a common TCI, and a unified TCI may be interchangeably interpreted. In the present disclosure, a UL TCI, a UL common TCI, a UL unified TCI, a common TCI, and a unified TCI may be interchangeably interpreted.

In the present disclosure, a case of a joint TCI pool and a case where a joint TCI pool is configured may be interchangeably interpreted. In the present disclosure, a case of a separate TCI pool and a case where a separate TCI pool is configured may be interchangeably interpreted.

In the present disclosure, a case where a joint TCI pool is configured, a case where a TCI pool configured for DL and a TCI pool configured for UL are in common, a case where a TCI pool for both DL and UL is configured, and a case where one TCI pool (one set of TCIs) is configured may be interchangeably interpreted.

In the present disclosure, a case where separate TCI pools are configured, a case where a TCI pool configured for DL and a TCI pool configured for UL are different from each other, a case where a TCI pool for DL (first TCI pool, first TCI set) and a TCI pool for UL (second TCI pool, second TCI set) are configured, a case where a plurality of TCI pools (plurality of sets of TCIs) are configured, and a case where a TCI pool for DL is configured may be interchangeably interpreted. When a TCI pool for DL is configured, a TCI pool for UL may be equal to the configured TCI pool.

In the present disclosure, a channel/RS to which a common TCI is applied may be a PDSCH/HARQ-ACK information/PUCCH/PUSCH/CSI-RS/SRS.

In the present disclosure, a CC/BWP to which a unified TCI state is applied, an application destination of a unified TCI state, and an application destination may be interchangeably interpreted.

In the present disclosure, a first QCL type and QCL type A may be interchangeably interpreted. A second QCL type and QCL type D may be interchangeably interpreted.

In the following, in each of the embodiments of the present disclosure, a pool including a plurality of unified TCI states may be configured/activated, and one or more TCI states of the plurality of unified TCI states may be indicated, for the UE. The configuration/activation may be performed by configuration information transmitted via higher layer signaling (for example, RRC signaling/MAC CE). The indication may be performed by indication information transmitted by using DCI.

Note that, in the present disclosure, a signaling structure, signaling, a configuration, a structure, configuration information, indication, indication information, and the like may be interchangeably interpreted.

First Embodiment

The UE may follow a QCL restriction(s) described in at least one of Embodiments 1-1 and 1-2 below, as a TCI state pool for CA.

Embodiment 1-1

In Embodiment 1-1, a single TCI state pool may be configured for the UE by RRC for a set of a plurality of configured CCs (cells)/BWPs. In Embodiment 1-1, the UE may follow at least one of Option 1-A and Option 1-B to be described below in a configuration of a second QCL type (for example, QCL type D).
{Option 1-A}
The UE may follow a specific QCL restriction different from the QCL restrictions defined in Rel. 16 described above. The QCL restriction may be that, in a configuration of a TCI state of a DMRS for PDCCH/DMRS for PDSCH, when a TRS of the first QCL type (for example, QCL type A) and a TRS of the second QCL type (for example, QCL type D) are present, the resources of the TRS of the first QCL type and the TRS of the second QCL type may be possible to be different from each other. For the QCL restriction, details will be described in the second embodiment below.

{Option 1-B}
The UE may perform configuration of the second QCL type (for example, QCL type D) in accordance with the same method of configuring the first QCL type (for example, QCL type A). For example, with no CC (cell)/BWP ID for a QCL type D RS in a TCI state, a CC (cell)/BWP ID for the QCL type D RS may be determined according to at least one of a target CC (cell) in a TCI state and a corresponding active BWP.

For example, for each active BWP applied for each CC, the UE may determine (locate) a corresponding QCL type D source RS by using a corresponding BWP ID, CC ID, and QCL type D RS source ID.

Embodiment 1-2

In Embodiment 1-2, a TCI state pool may be configured for the UE by RRC for each individual CC. In Embodiment 1-2, the UE may follow at least one of Option 2-A and Option 2-B to be described below in a configuration of the second QCL type (for example, QCL type D).
{Option 2-A}
The UE may follow a specific QCL restriction different from the QCL restrictions defined in Rel. 16 described above. The QCL restriction may be that, in a configuration of a TCI state of a DMRS for PDCCH/DMRS for PDSCH, when a TRS of the first QCL type (for example, QCL type A) and a TRS of the second QCL type (for example, QCL type D) are present, the resources of the TRS of the first QCL type and the TRS of the second QCL type may be possible to be different from each other. For the QCL restriction, details will be described in the second embodiment below.
{Option 2-B}
For the UE, an RS of the second QCL type (for example, QCL type D) may be derived (determined) from the same ID as the ID of the TCI state configured in each CC.

Second Embodiment

In a second embodiment, a description will be given of QCL restrictions different from the QCL restrictions defined in Rel. 16 (or previous versions) described above. In the present disclosure, the QCL restrictions defined in Rel. 16 (or previous versions) may be referred to as first QCL restrictions. The QCL restrictions different from the QCL restrictions defined in Rel. 16 (or previous versions) may be referred to as second QCL restrictions.

For a QCL source RS in a common TCI state, a higher layer parameter (for example, qcl_Type2) related to the second QCL type (for example, QCL type D) may be configured for the UE in addition to a higher layer parameter (for example, qcl_Type1) related to an RS of the first QCL type (for example, QCL type A).

In the common TCI state, the RS of the first QCL type and the RS of the second QCL type may be different from each other. For example, the UE may assume that configurations different between the QCL type A RS and the QCL type D RS may be performed.

When the RS of the first QCL type and the RS of the second QCL type are different from each other in the common TCI state, a case where the RS of the first QCL type is a TRS and the RS of the second QCL type is a CSI-RS configured with repetition (with higher layer parameter "repetition") may be excluded.

The RS of the first QCL type and the RS of the second QCL type may be RSs in different CCs included in a common CC list. Note that the RS of the first QCL type and the RS of the second QCL type may be RSs with the same RS ID or RSs with the same TCI ID in different CCs included in the common CC list. The RS of the first QCL type and the RS of the second QCL type may be RSs in a common RS list/common TCI state list. According to these, a QCL type D RS can be configured/indicated appropriately with low control overhead without the NW transmitting an additional CSI-RS resource (for example, a CSI-RS configured with repetition).

The second QCL restrictions configurable for the UE will be described below. The UE may assume that QCL source RSs (QCL type A RS and QCL type D RS) configured in a TCI state of a DMRS for PDCCH/DMRS for PDSCH follow (Case 4) to (Case 5) below in addition to/instead of (Case 1) to (Case 3) described above:

(Case 4) the RS of the first QCL type is a TRS (CSI-RS configured with the higher layer parameter trs-Info), and the RS of the second QCL type is a TRS (CSI-RS configured with the higher layer parameter trs-Info), and (Case 5) the RS of the first QCL type is a TRS (CSI-RS configured with the higher layer parameter trs-Info), and the RS of the second QCL type is an SSB.

Note that it may be defined that source RSs of the second QCL type in a TCI state of a DMRS for PDCCH/DMRS for PDSCH in the respective CCs are to be identical RSs among CCs.

(Case 4)

In Case 4, the RS of the first QCL type and the RS of the second QCL type may be different CSI-RS resources.

Figure 6:
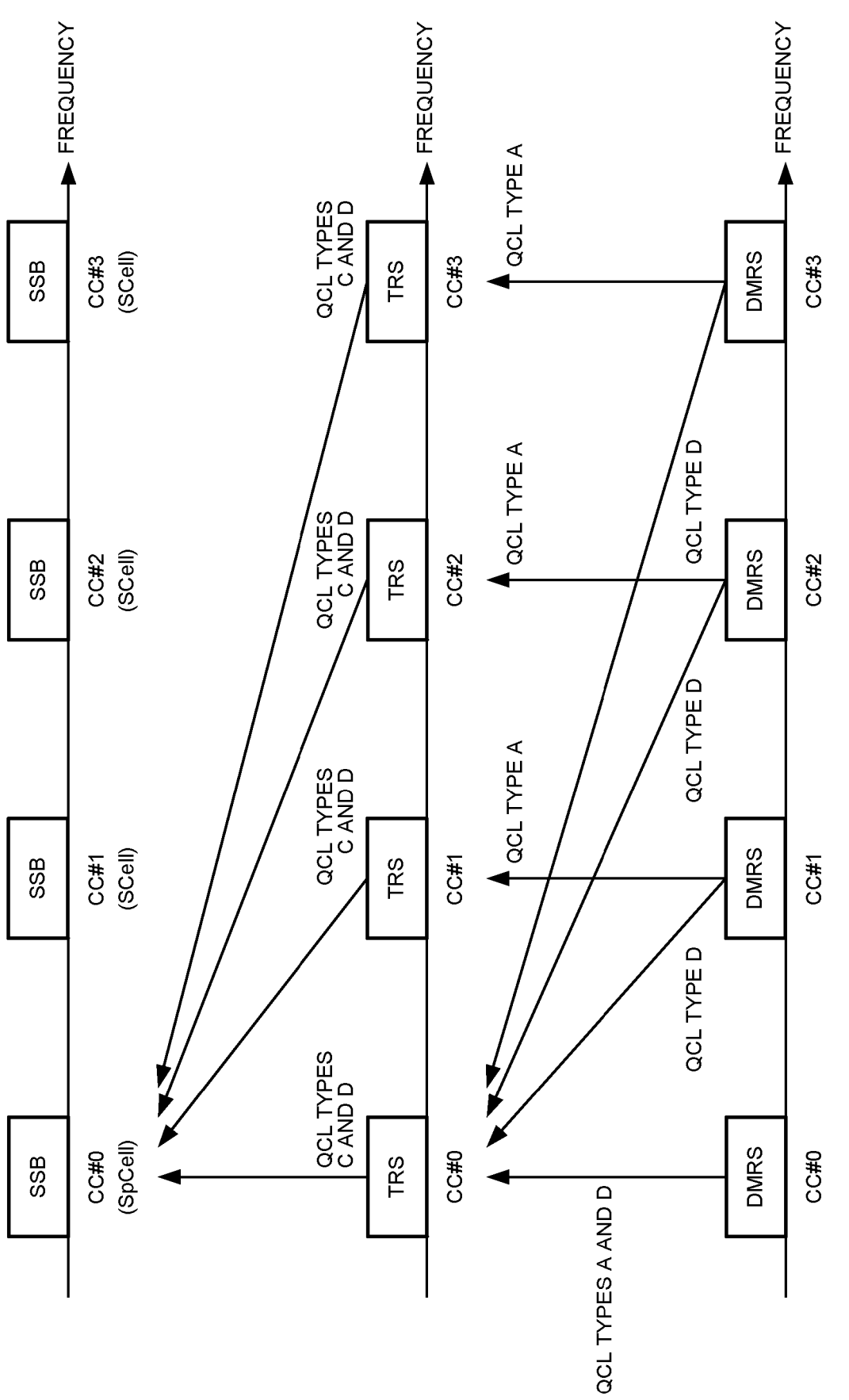
FIG. 6 is a diagram to show an example of a QCL restriction in Case 4.

FIG. 6 is a diagram to show an example of a QCL restriction in Case 4. In the example shown in FIG. 6, a TRS of each CC is in a relationship of QCL type C and QCL type D with an SSB of CC #0. A DMRS (DMRS for PDCCH/DMRS for PDSCH) of each CC is in a relationship of QCL type A with a TRS of the same CC. Here, the DMRS of each CC may be in a relationship of QCL type D with a TRS of CC #0.

(Case 5)

For the RS of the first QCL type, a TRS is configured for time frequency tracking since the resource density is higher and more accurate time frequency correction is possible in a case of using a TRS than an SSB. In contrast, the RS of the second QCL type is used to obtain a UL/DL (transmission/reception) spatial domain filter and can operate even in the resource density of an SSB.

Figure 7:
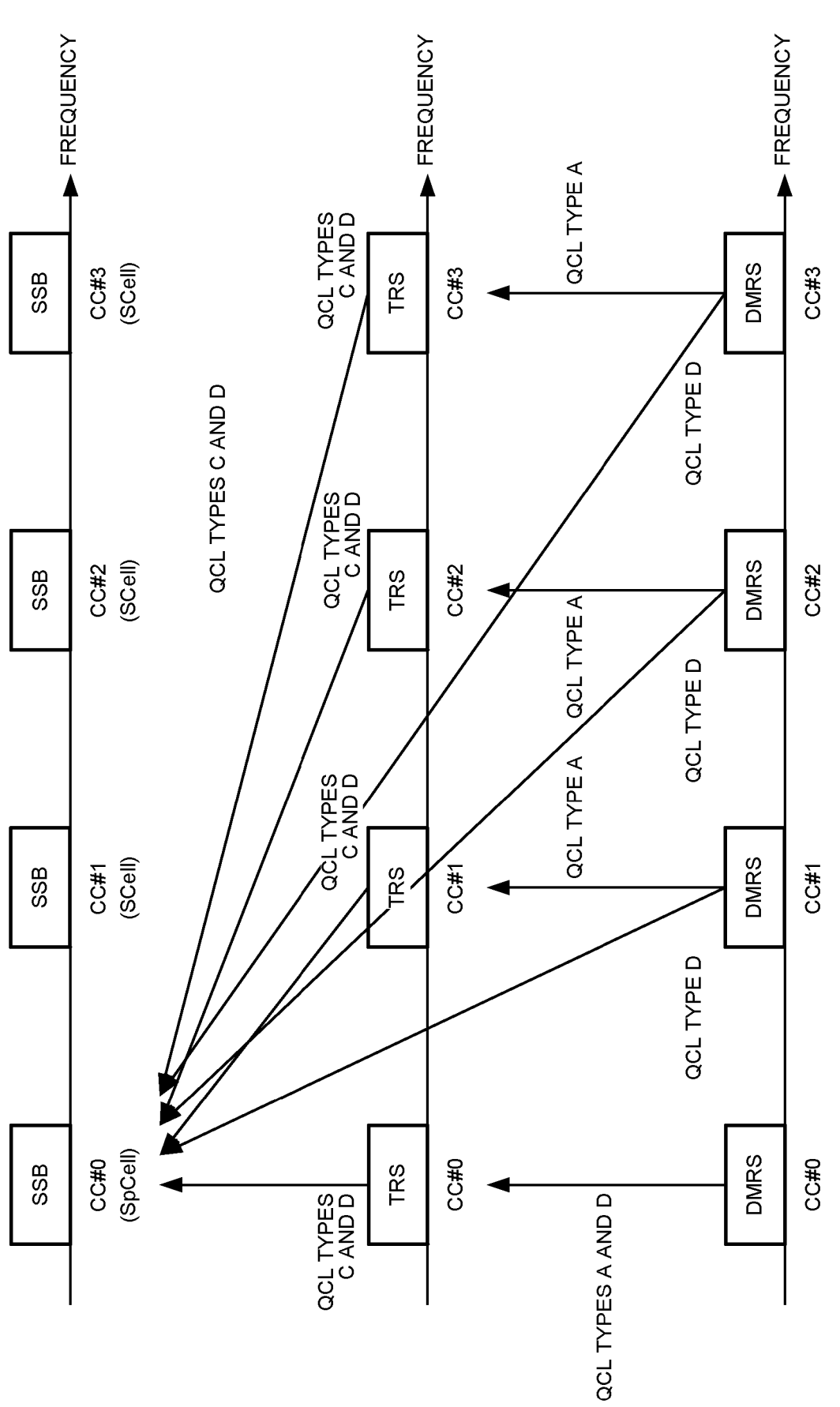
FIG. 7 is a diagram to show an example of a QCL restriction in Case 5.

FIG. 7 is a diagram to show an example of a QCL restriction in Case 5. In the example shown in FIG. 7, a TRS of each CC is in a relationship of QCL type C and QCL type D with an SSB of CC #0. A DMRS (DMRS for PDCCH/DMRS for PDSCH) of each CC is in a relationship of QCL type A with a TRS of the same CC. Here, the DMRS of each CC may be in a relationship of QCL type D with the SSB of CC #0.

Third Embodiment

In a third embodiment, details of Option 1-A described above will be described. In the third embodiment, information (configuration information) related to an RS of the first QCL type (for example, QCL type A) which the UE is notified of may include a specific number of (for example, four) cell IDs. The cell IDs may include a parameter indicating a target cell (CC). The configuration information may include a specific number of (for example, 64) RS IDs (refer to FIG. 8).

In the present disclosure, the target cell may mean the cell of a target RS in a QCL relationship (cell of a DMRS using a TCI state, cell using a DMRS to which a TCI state is applied, cell to which a TCI state is applied). In each of the embodiments of the present disclosure, a case of notifying the UE of a parameter explicitly indicating a target cell is illustrated. However, when a parameter indicating a target cell is not defined and the UE is not notified of a cell ID, the UE may judge that a target cell is implicitly indicated.

The UE may be notified of information (configuration information) related to an RS of the second QCL type (for example, QCL type D). When the UE is notified of the configuration information, the configuration information may include a specific number of (for example, 4) cell IDs. The cell IDs may include a parameter indicating a target cell (CC). The configuration information may include a specific number of (for example, 64) RS IDs (refer to FIG. 8).

Note that, in Rel. 15, a QCL type A RS is only an RS configured with a TCI state. In other words, the cell ID of the QCL type A RS cannot be configured for any cell other than the target cell. Hence, the information related to the RS of the first QCL type which the UE is notified of may include a specific number of (for example, 64) RS IDs without including any cell ID.

Note that, although a case where the number of cell IDs included in the information related to an RS of each QCL type is four and the number of pieces of information related to RS IDs is 64 has been described in the example in FIG. 8, the numbers are not limited to these. The numbers may be different for each QCL type or may be in common.

The UE may assume that an RS of the second QCL type of each CC is configured as a common RS of the second QCL type for the CCs. The NW may configure the RS of the second QCL type of each CC as the common RS of the second QCL type for the CCs (Embodiment 3-1).

The UE may assume that an RS of the second QCL type of each CC is not explicitly configured/indicated. The NW need not explicitly configure/indicate the RS of the second QCL type of each CC (Embodiment 3-2).

In Embodiment 3-2, the UE need not be explicitly configured/indicated with the RS ID of the RS of the second QCL type. The UE may judge the RS of the first QCL type indicated by the cell ID and the RS ID of the RS of the first QCL type with the cell ID of the RS of the second QCL type, as the RS of the second QCL type.

In Embodiment 3-2, the UE need not be explicitly configured/indicated with the cell ID of the RS of the second QCL type. The UE may determine the cell ID of the RS of the second QCL type, based on a specific rule. The specific rule may be that the smallest (or largest) cell ID/BWP ID included in a CC list is judged as the cell ID of the RS of the second QCL type.

In Embodiment 3-2, the UE need not be explicitly configured/indicated with the RS ID and the cell ID of the RS of the second QCL type. The UE may determine the RS ID and the cell ID of the RS of the second QCL type, based on the configured/indicated RS of the first QCL type and the above-described specific rule.

Here, the UE need recognize whether the RS of the second QCL type is configured. Specifically, when the RS of the second QCL type is configured, the UE need determine a UL/DL spatial domain filter, based on the configured RS of the second QCL type. In view of this, the UE may receive information related to whether an RS of the second QCL type is configured, to be indicated with whether the RS of the second QCL type is configured.

For example, in the unified TCI state framework, when a higher layer parameter related to an RS of the second QCL type is configured to be enabled (for example, enable), the UE may judge that an RS of the second QCL type is configured, to determine a UL/DL spatial domain filter. Here, the UE may determine the second QCL type RS to use, in accordance with the above-described method.

Embodiment 3-2 described above corresponds to a case where an RS of the second QCL type is a TRS (CSI-RS), in other words, (Case 4) described above. However, Embodiment 3-2 described above may be applied to a case where the RS of the second QCL type is an SSB, in other words, (Case 5) described above (Embodiment 3-3). In other words, the UE may judge to use an SSB for the RS of the second QCL type.

In Embodiment 3-3, the UE need not be explicitly configured/indicated with the RS ID of an RS of the second QCL type. The UE may judge an SSB with the cell ID of the RS of the second QCL type, as the RS of the second QCL type.

In Embodiment 3-3, the UE need not be explicitly configured/indicated with the cell ID of the RS of the second QCL type. The UE may determine the cell ID of the RS of the second QCL type, based on a specific rule. The specific rule may be that the smallest (or largest) cell ID/BWP ID included in a CC list is judged as the cell ID of the RS of the second QCL type.

In Embodiment 3-3, the UE need not be explicitly configured/indicated with the RS ID and the cell ID of an RS of the second QCL type. The UE may determine the RS ID and the cell ID of the RS of the second QCL type, based on the configured/indicated SSB and the above-described specific rule.

Here, the UE need recognize whether an RS of the second QCL type is configured. Specifically, when an RS of the second QCL type is configured, the UE need determine a UL/DL spatial domain filter, based on the configured RS of the second QCL type. In view of this, the UE may receive information related to whether an RS of the second QCL type is configured, to be indicated with whether an RS of the second QCL type is configured.

For example, in the unified TCI state framework, when a higher layer parameter related to an RS of the second QCL type is configured to be enabled (for example, enable), the UE may judge that an RS of the second QCL type is configured, to determine a UL/DL spatial domain filter. Here, the UE may determine the RS of the second QCL type to use, in accordance with the above-described method.

According to the third embodiment above, even when a single TCI state pool is configured for the UE by RRC for a set of a plurality of configured CCs (cells)/BWPs, an RS of the second QCL type can be determined appropriately.

Fourth Embodiment

In a fourth embodiment, details of Option 2-A described above will be described. In Option 2-A described above, a common TCI state pool is configured for each CC/BWP.

The UE may assume that an RS of the second QCL type (for example, QCL type D) of a common TCI state pool of each CC is configured in common for the CCs. The NW may configure the RS of the second QCL type of the common TCI state pool of each CC as the common RS of the second QCL type for the CCs (Embodiment 4-1).

Figure 9:
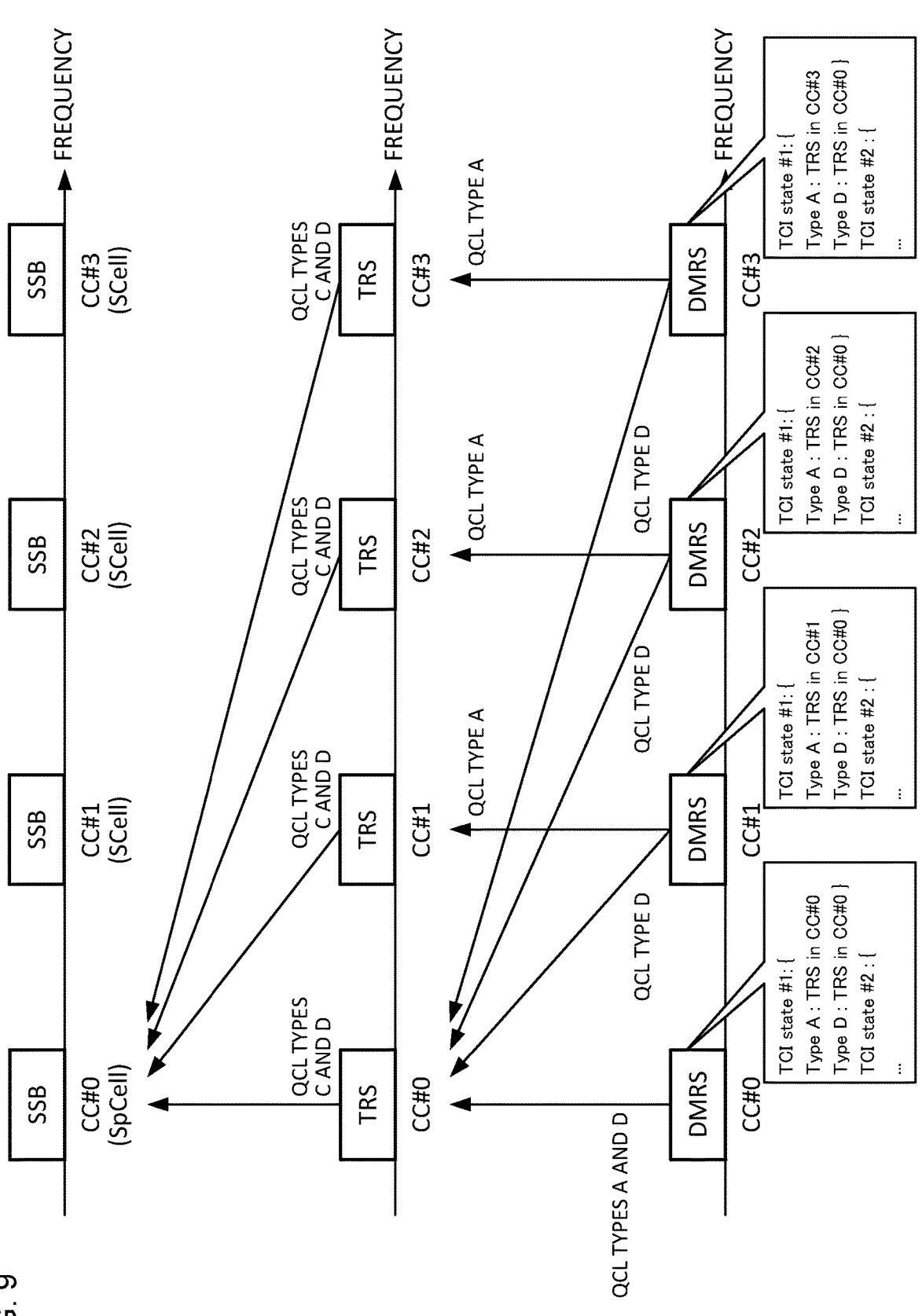
FIG. 9 is a diagram to show an example of a configuration of QCL type D RSs according to Embodiment 4-1.

FIG. 9 is a diagram to show an example of a configuration of QCL type D RSs according to Embodiment 4-1. In the example shown in FIG. 9, a TRS of each CC is in a relationship of QCL type C and QCL type D with an SSB of CC #0. A DMRS (DMRS for PDCCH/DMRS for PDSCH) of each CC is in a relationship of QCL type A with a TRS of the same CC. Here, the DMRS of each CC may be in a relationship of QCL type D with a TRS of CC #0.

The UE may assume that an RS of the second QCL type of the common TCI state pool of each CC is not explicitly configured/indicated for the CCs. The NW need not explicitly configure/indicate the RS of the second QCL type of the common TCI state pool of each CC, for the CCs (Embodiment 4-2).

In Embodiment 4-2, the UE need not be explicitly configured/indicated with the RS ID of the RS of the second QCL type. The UE may judge an RS or an SSB of the first QCL type (for example, QCL type A) with the cell ID of the RS of the second QCL type, as the RS of the second QCL type.

In Embodiment 4-2, the UE need not be explicitly configured/indicated with the cell ID of the RS of the second QCL type. The UE may determine the cell ID of the RS of the second QCL type, based on a specific rule. The specific rule may be that the smallest (or largest) cell ID/BWP ID included in a CC list is judged as the cell ID of the RS of the second QCL type.

In Embodiment 4-2, the UE need not be explicitly configured/indicated with the RS ID and the cell ID of an RS of the second QCL type. The UE may determine the RS ID and the cell ID of the RS of the second QCL type, based on the configured/indicated RS or SSB of the first QCL type and the above-described specific rule.

Here, the UE need recognize whether the RS of the second QCL type is configured. Specifically, when the RS of the second QCL type is configured, the UE need determine a UL/DL spatial domain filter, based on the configured RS of the second QCL type. In view of this, the UE may receive information related to whether an RS of the second QCL type is configured, to be indicated with whether the RS of the second QCL type is configured.

For example, in the unified TCI state framework, when a higher layer parameter related to an RS of the second QCL type is configured to be enabled (for example, enable), the UE may judge that an RS of the second QCL type is configured, to determine a UL/DL spatial domain filter. Here, the UE may determine the RS of the second QCL type to use, in accordance with the above-described method.

According to the fourth embodiment above, even when a TCI state pool is configured for the UE by RRC for each individual CC, an RS of the second QCL type can be determined appropriately.

Fifth Embodiment

In a fifth embodiment, details of Option 2-B described above will be described. In Option 2-B described above, as in Option 2-A, a common TCI state pool is configured for each CC/BWP.

The UE may use the common TCI state pool configured for each CC/BWP to use an RS of the second QCL type (for example, QCL type D) of each common TCI state. A QCL source RS of a DMRS (DMRS for PDCCH/DMRS for PDSCH) of each CC/BWP may be restricted to be in a relationship of QCL type D for each CC/BWP.

Figure 10:
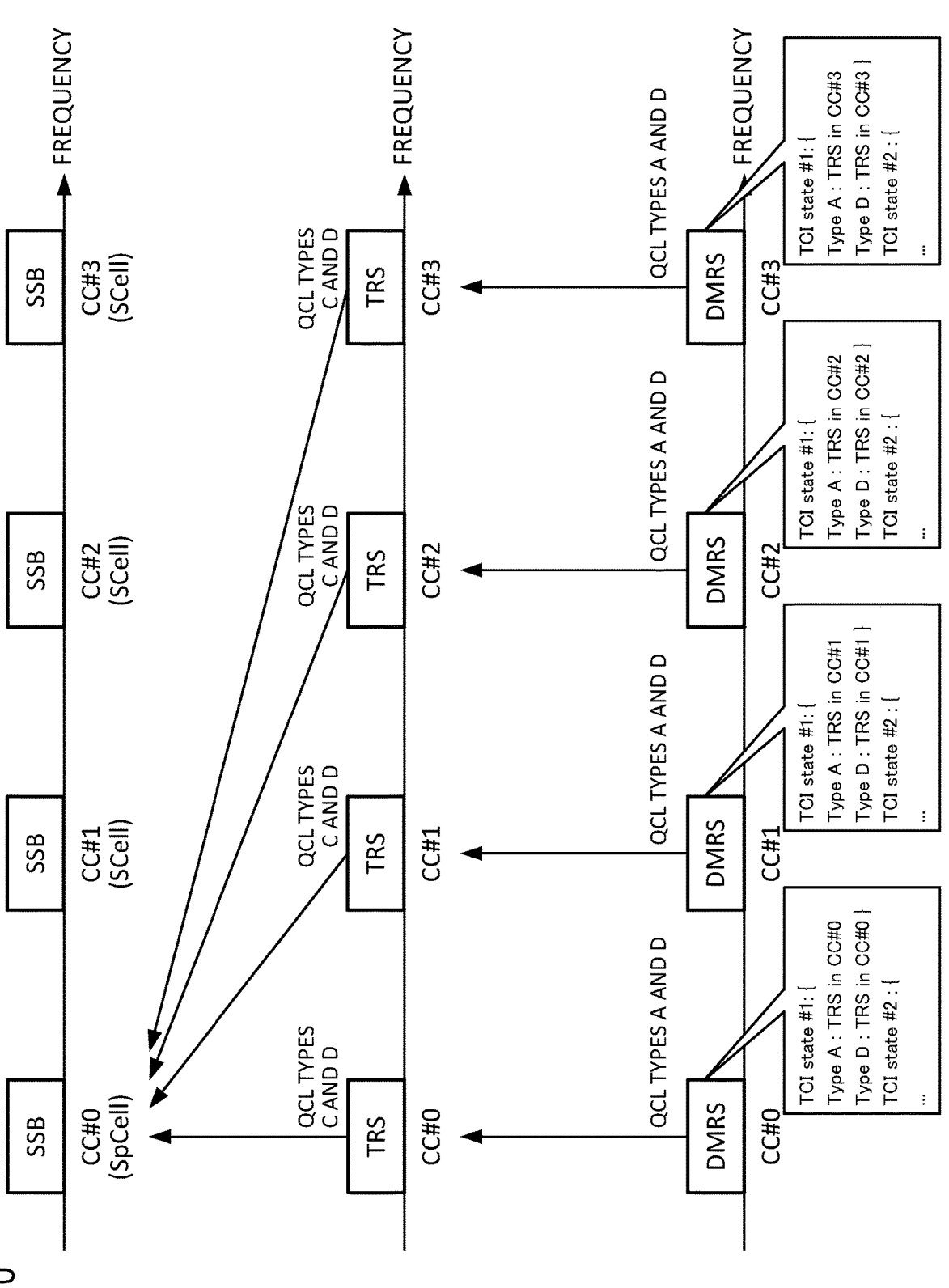
FIG. 10 is a diagram to show an example of a configuration of QCL type D RSs according to a fifth embodiment.

FIG. 10 is a diagram to show an example of a configuration of QCL type D RSs according to the fifth embodiment. In the example shown in FIG. 10, a TRS of each CC is in a relationship of QCL type C and QCL type D with an SSB of CC #0. A DMRS (DMRS for PDCCH/DMRS for PDSCH) of each CC is in a relationship of QCL type A with a TRS of the same CC. Here, the DMRS of each CC may be in a relationship of QCL type D with a TRS of the same CC.

As described above, in the fifth embodiment, the TRS of each CC/BWP may be configured with a common SSB as an "associated SSB."

According to the fifth embodiment above, even when a TCI state pool is configured for the UE by RRC for each individual CC, an RS of the second QCL type can be determined appropriately while compatibility with Rel. 15 is secured.

Sixth Embodiment

In a sixth embodiment, timing from an indication of a beam (for example, a common TCI state) based on DCI to application of the beam will be described.

In the present disclosure, the timing from an indication of a beam (for example, a common TCI state) based on DCI to application of the beam, a beam application time, a period to beam application, and the like may be interchangeably interpreted.

In the present disclosure, timing of start of the beam application time may be initiation of reception (end of reception) of DCI indicating application of the beam (for example, a common TCI state) (for example, a symbol, a slot, or a specific time unit). The timing of start of the beam application time may be timing of initiation of transmission (end of transmission) of HARQ-ACK information for DCI indicating application of the beam (for example, a common TCI state) (for example, a symbol, a slot, or a specific time unit).

Note that, for the DCI indicating the application of the beam, any DCI format defined in Rel. 16 (or previous versions) may be used, or a new DCI format defined in Rel. 17 (or later versions) may be used.

Figure 11:
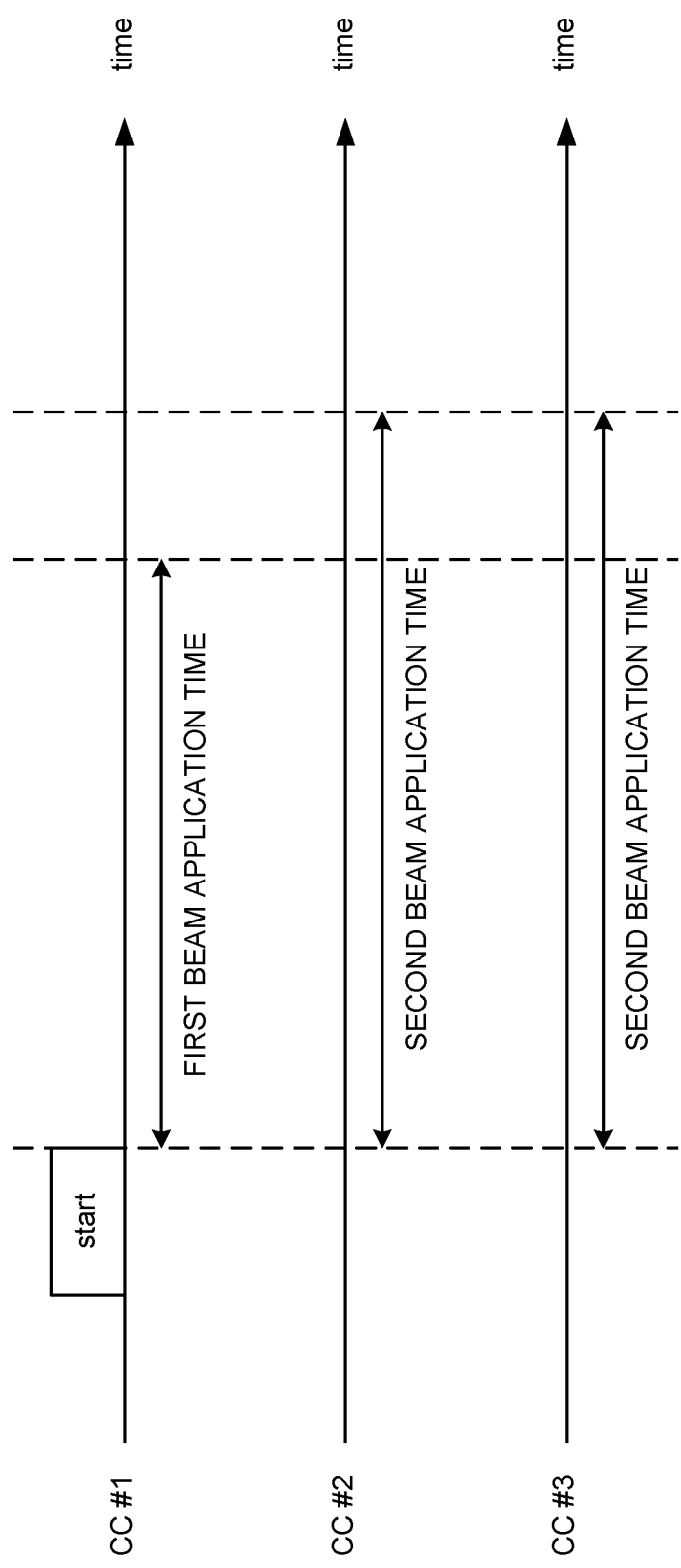
FIG. 11 is a diagram to show an example of beam application times in a plurality of CCs.

In the present disclosure, a beam application time for a CC/BWP in which DCI indicating application of a beam is received may be referred to as a first beam application time. A beam application time for a CC/BWP different from the CC/BWP in which DCI indicating application of a beam is received may be referred to as second beam application time (refer to FIG. 11).

The UE may assume that a definition/configuration/indication may be made so that the first beam application time and the second beam application time would be the same/different from each other. For example, the UE may assume that the second beam application time is defined/configured/indicated to be longer (or shorter) than the first beam application time or equal to the first beam application time (Embodiment 6-1).

When the unified TCI state framework in CA is used, the UE may assume that beam application times of a plurality of (for example, all the) CCs included in a list of CCs to which a unified TCI state is applied (CC application list) would be equally defined/configured/indicated (Embodiment 6-2). With this method, since a beam application time is different for each CC, the TCI state results in being different for each CC, which can prevent a situation of not being able to perform CA appropriately.

The UE may assume that the same beam application time as the longest beam application time among the beam application times for the CCs included in the CC application list would be defined/configured/indicated.

Alternatively, the UE may assume that the same beam application time as the shortest beam application time among the beam application times for the CCs included in the CC application list would be defined/configured/indicated.

<<Method of Configuring/indicating Beam Application Time>>
{Method 1}

The UE may be configured with a beam application time for each CC/each BWP in a CC. The UE may receive information related to a configuration of a beam application time for each CC/each BWP of a CC by using higher layer signaling (for example, RRC signaling).

Here, the beam application times for CCs/BWPs may be different from each other or may be a common value.
{Method 2}

The UE may be configured with a beam application time for each bandwidth (or for every plurality of CCs/BWPs). The UE may receive information related to a configuration of a beam application time for every plurality of CCs/BWPs by using higher layer signaling (for example, RRC signaling).

The beam application times for CCs/BWPs may be different from each other or may be a common value. For example, a beam application time applicable for all the CCs may be calculated based on process times of the UE in the respective CCs, to have a common value for the beam application times for the respective CCs/BWPs.

When the beam application times for the respective CCs/BWPs are different from each other, the UE may receive information related to the beam application time for each of the CCs/BWPs.

When the beam application times for the respective CCs/BWPs are different from each other, the UE may receive information related to the beam application time for a certain CC/BWP and determine a beam application time for another CC/BWP, based on a specific rule. For example, the UE may receive information related to the first beam application time and determine the second beam application time, based on a specific rule.

The specific rule may be that the UE is notified of a specific offset value for the first beam application time and determines the second beam application time by adding/subtracting the specific offset value to/from the first beam application time.

The specific offset value may be configured for the UE by higher layer signaling, defined in advance in a specification, or may be reported to the NW as UE capability.
{Method 3}

The UE may be configured with a beam application time for each CC application list. The UE may receive information related to a configuration of a beam application time for each CC application list by using higher layer signaling (for example, RRC signaling). According to Method 3, it is possible to support a situation where the beam application time differs depending on the number of CCs included in each CC application list and a bandwidth.
{Method 4}

The UE may be configured with a beam application time for each common TCI state. The UE may receive information related to a configuration of a beam application time for each common TCI state by using higher layer signaling (for example, RRC signaling)/DCI. According to Method 4, a different beam application time can be configured for each indicated TCI state, which enables DCI to indicate the beam application time.

Seventh Embodiment

In a unified TCI state in CA, the UE may be indicated with to which CC a TCI state is to be applied for each piece of DCI.

Here, DCI may include information indicating a CC/BWP being an application destination of a TCI state. For example, for the UE, one or more CC application lists are configured in advance by higher layer signaling, and one of the CC application list(s) may be indicated by DCI to dynamically switch the CC being an application destination.

The UE may be scheduled with PDSCHs of a plurality of CCs by one piece of DCI and dynamically indicated with a CC/BWP to which a TCI state is applied, by the DCI.

Figure 12:
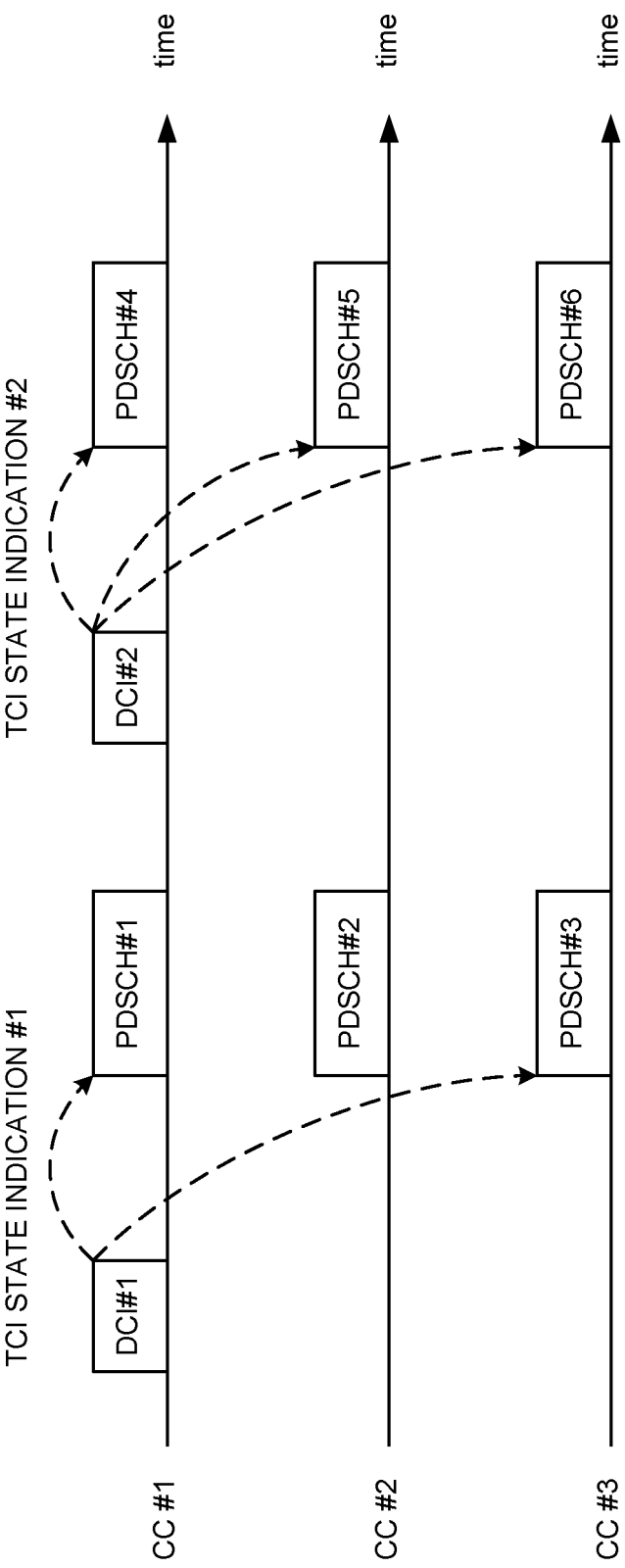
FIG. 12 is a diagram to show an example of TCI state indications for a plurality of CCs by one piece of DCI.

FIG. 12 is a diagram to show an example of TCI state indications for a plurality of CCs by one piece of DCI. In FIG. 12, the UE receives DCI #1 scheduling PDSCH #1 in CC #1 and PDSCH #3 in CC #3. The UE receives DCI #2 scheduling PDSCH #4 in CC #1, PDSCH #5 in CC #2, and PDSCH #6 in CC #3. DCI #1 includes TCI state indication (indication information) #1 indicating a TCI state to be applied to PDSCH #1 (DMRS for PDSCH #1) and a TCI state to be applied to PDSCH #3 (DMRS for PDSCH #3). DCI #2 includes TCI state indication #2 indicating a TCI state to be applied to PDSCH #4 (DMRS for PDSCH #4), a TCI state to be applied to PDSCH #5 (DMRS for PDSCH #5), and a TCI state to be applied to PDSCH #6 (DMRS for PDSCH #6). The UE determines a TCI state to be applied to each PDSCH (DMRS for PDSCH), based on a TCI state indication included in the DCI.

According to the seventh embodiment above, more flexible and more dynamic application of a unified TCI state using DCI can be performed.

Eighth Embodiment

A higher layer parameter (RRC information element)/UE capability corresponding to at least one function (characteristics, feature) in the first to seventh embodiments may be defined. The UE capability may indicate that the UE supports this function.

The UE configured with the higher layer parameter corresponding to the function may perform the function. "The UE not configured with the higher layer parameter corresponding to the function does not perform the function" may be defined.

The UE that has reported the UE capability indicating support of the function may perform the function. "The UE that has not reported the UE capability indicating support of the function does not perform the function" may be defined.

When the UE reports the UE capability indicating support of the function and is configured with the higher layer parameter corresponding to the function, the UE may perform the function. "When the UE does not report the UE capability indicating support of the function or when the UE is not configured with the higher layer parameter corresponding to the function, the UE does not perform the function" may be defined.

The function may be the unified TCI state framework in CA or the unified TCI state framework applied to a plurality of CCs/BWPs.

For example, the UE capability/higher layer parameter may be defined by the number of unified TCI states that can be configured by RRC signaling in the unified TCI state framework.

For example, the UE capability/higher layer parameter may be defined by the number of active unified TCI states that can be configured by a MAC CE in the unified TCI state framework.

For example, the UE capability/higher layer parameter may be defined by whether the UE supports at least one of Case 4 and Case 5 described above.

For example, the UE capability/higher layer parameter may be defined by whether DCI can indicate a unified TCI state to be applied to one or more CCs/BWPs. When DCI cannot indicate a unified TCI state to be applied to one or more CCs/BWPs, the UE can support only the unified TCI state framework based on a MAC CE in one CC. In other words, when a unified TCI state can be applied to a plurality of BWPs/CCs, the UE need not necessarily assume (expect) to indicate the unified TCI state by DCI performing beam indication.

According to the eighth embodiment above, the UE can implement the above functions while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 13:
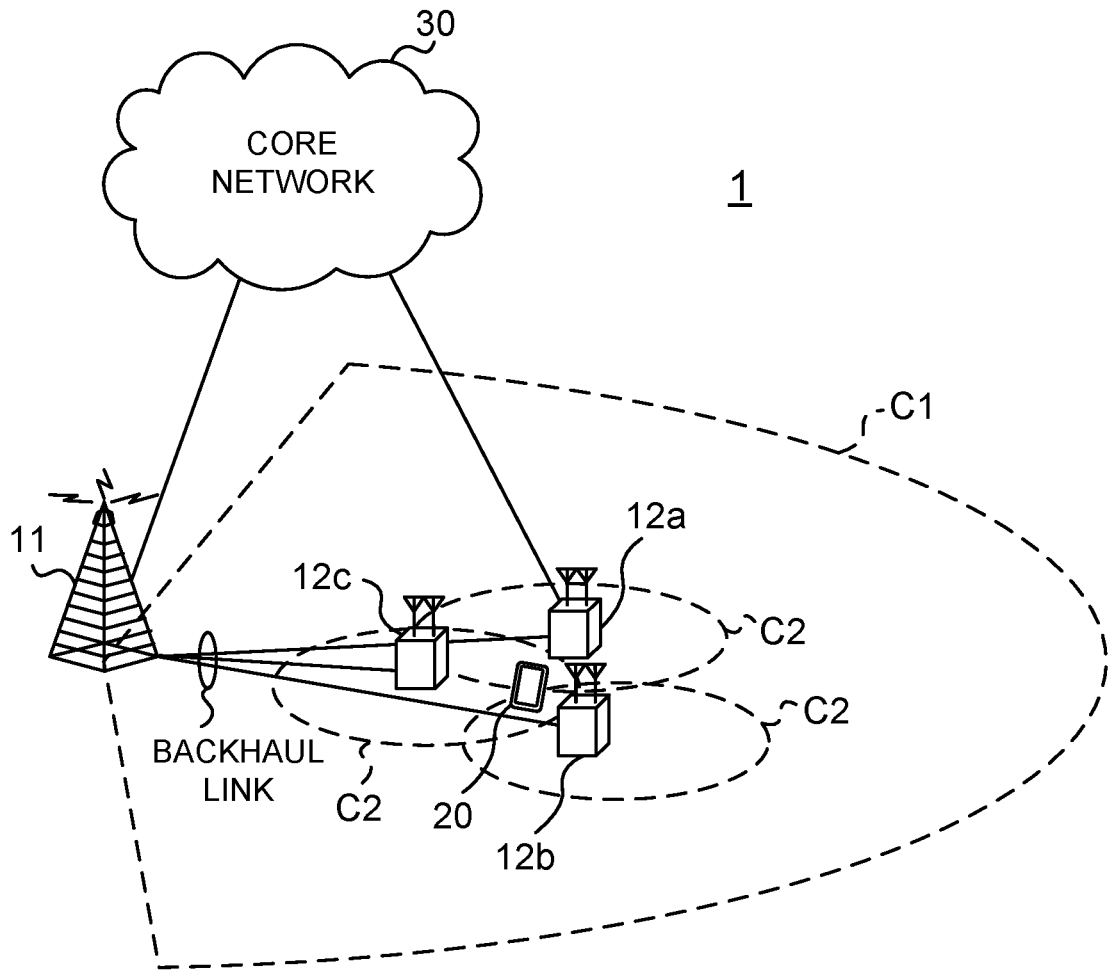
FIG. 13 is a diagram to show an example of a schematic structure of a radio communication system according to one embodiment.

FIG. 13 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 14:
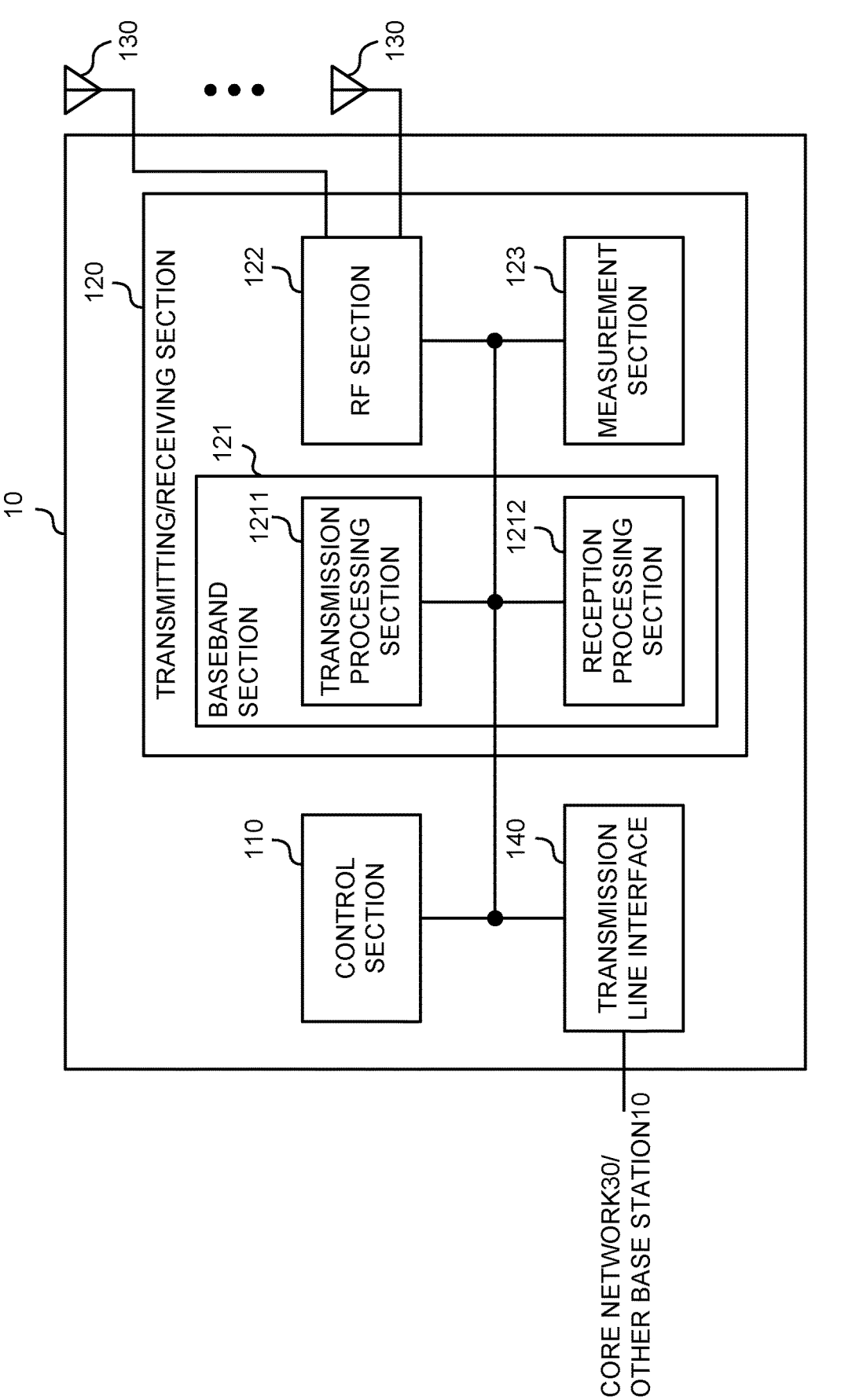
FIG. 14 is a diagram to show an example of a structure of a base station according to one embodiment.

FIG. 14 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a list of a plurality of serving cells or a plurality of bandwidth parts and transmit configuration information of a plurality of transmission configuration indication (TCI) states applicable to a plurality of types of channels. The control section 110 may determine a reference signal of a first quasi-co-location (QCL) type and a reference signal of a second QCL type to be applied to the plurality of serving cells or the plurality of bandwidth parts, based on a restriction related to the reference signal of the first QCL type and the reference signal of the second QCL type for a demodulation reference signal (DMRS) and the configuration information (first to fifth embodiments).

The transmitting/receiving section 120 may transmit downlink control information (DCI) indicating one or more transmission configuration indication (TCI) states applicable to a plurality of types of channels of the plurality of serving cells. The control section 110 may determine a period to application of the one or more TCI states, based on timing of transmitting the DCI or timing of receiving Hybrid Automatic Repeat Request Acknowledgement (HARQ-ACK) for the DCI (sixth embodiment).

(User Terminal)

Figure 15:
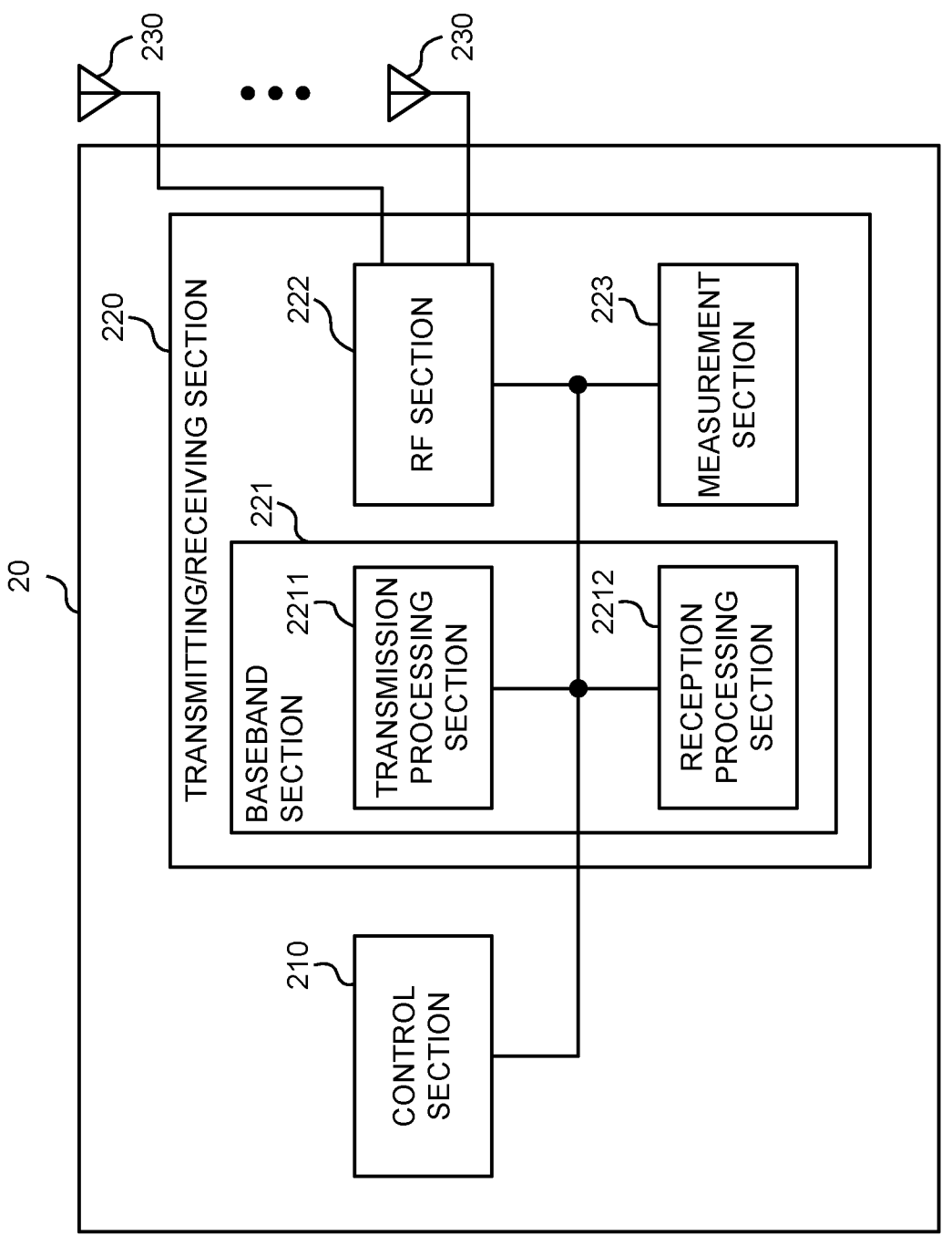
FIG. 15 is a diagram to show an example of a structure of a user terminal according to one embodiment.

FIG. 15 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a list of a plurality of serving cells or a plurality of bandwidth parts and receive configuration information of a plurality of transmission configuration indication (TCI) states applicable to a plurality of types of channels. The control section 210 may determine a reference signal of a first quasi-co-location (QCL) type and a reference signal of a second QCL type to be applied to the plurality of serving cells or the plurality of bandwidth parts, based on a restriction related to the reference signal of the first QCL type and the reference signal of the second QCL type for a demodulation reference signal (DMRS) and the configuration information (first to fifth embodiments).

The reference signal of the first QCL type and the reference signal of the second QCL type may be different from each other (second embodiment).

A reference signal of a second QCL type in each of a plurality of serving cells or a plurality of bandwidth parts may be a common reference signal (third and fourth embodiments).

The transmitting/receiving section 220 may receive information related to the reference signal of the first QCL type. The control section 210 may determine the reference signal of the second QCL type, based on the information related to the reference signal of the first QCL type (third to fifth embodiments).

The transmitting/receiving section 220 may receive downlink control information (DCI) indicating one or more transmission configuration indication (TCI) states applicable to a plurality of types of channels of the plurality of serving cells. The control section 210 may judge a period to application of the one or more TCI states, based on timing of receiving the DCI or timing of transmitting Hybrid Automatic Repeat Request Acknowledgement (HARQ-ACK) for the DCI (sixth embodiment).

The control section 210 may assume that a period to application of a TCI state to a serving cell in which the DCI is received and a period to application of a TCI state to a serving cell other than the serving cell in which the DCI is received are configurable to have different lengths (sixth embodiment).

The control section 210 may determine, based on the period to application of a TCI state to a serving cell in which the DCI is received, the period to application of a TCI state to a serving cell other than the serving cell in which the DCI is received (sixth embodiment).

A period to application of a TCI state may be configured for each one serving cell. Alternatively, a period to application of a TCI state may be configured for every plurality of serving cells (sixth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
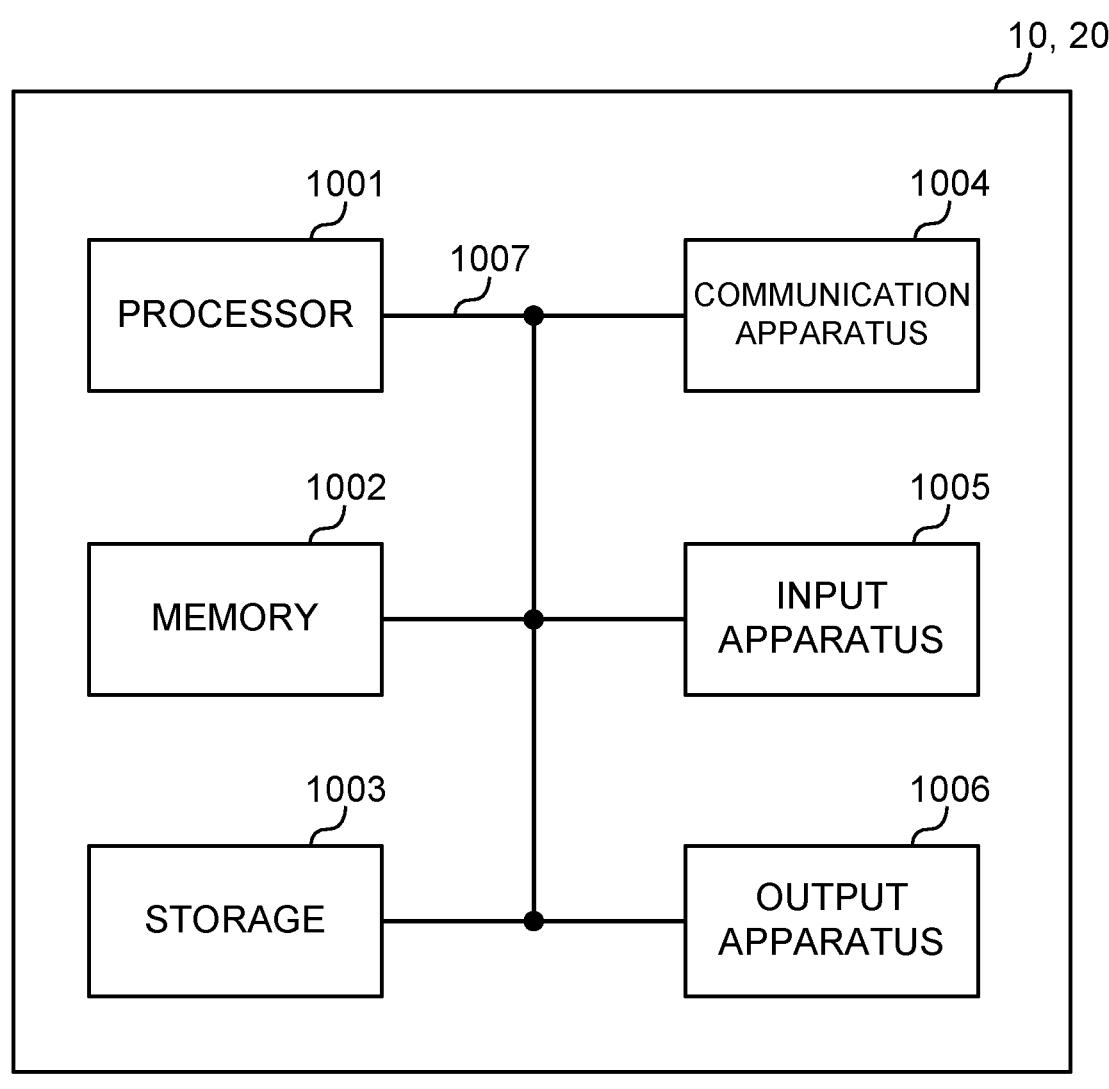
FIG. 16 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcar-rier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indi-ces.

The names used for parameters and so on in the present disclosure are in no respect limiting. Furthermore, math-ematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instruc-tions, commands, information, signals, bits, symbols, chips, and so on, all of which may be referenced throughout the herein-contained description, may be represented by volt-ages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control infor-mation (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 con-trol signals)," "L1 control information (L1 control signal)," and so on. Also, RRC signaling may be referred to as an "RRC message," and can be, for example, an RRC connec-tion setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description lan-guage," or called by other terms, should be interpreted broadly to mean instructions, instruction sets, code, code segments, program codes, programs, subprograms, software modules, applications, software applications, software pack-ages, routines, subroutines, objects, executable files, execu-tion threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of commu-nication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a list of a plurality of serving cells, and receives configuration information of a plurality of transmission configuration indication (TCI) states applicable to a plurality of types of channels; and a processor that determines a reference signal (RS) of a first quasi co-location (QCL) type and an RS of a second QCL type to be applied to the plurality of serving cells, based on the configuration information and a restriction related to the RS of the first QCL type and the RS of the second QCL type for a demodulation reference signal (DMRS), wherein an RS in a serving cell for which a TCI state is applied by the terminal is configured as the RS of the first QCL type, and an RS in a serving cell other than the serving cell for which the TCI state is applied by the terminal is located as the RS of the second QCL type.

2. The terminal according to claim 1, wherein the first QCL type is a QCL type related to delay spread, and the second QCL type is a QCL type related to spatial reception parameter.

3. The terminal according to claim 1, wherein the RS of the first QCL type is different from the RS of the second QCL type.

4. The terminal according to claim 1, wherein the RS of the second QCL type is common between serving cells of the plurality of serving cells.

5. A radio communication method for a terminal, comprising:

receiving a list of a plurality of serving cells, and receiving configuration information of a plurality of transmission configuration indication (TCI) states applicable to a plurality of types of channels; and determining a reference signal (RS) of a first quasi co-location (QCL) type and an RS of a second QCL type to be applied to the plurality of serving cells, based on the configuration information and a restriction related to the RS of the first QCL type and the RS of the second QCL type for a demodulation reference signal (DMRS), wherein an RS in a serving cell for which a TCI state is applied by the terminal is configured as the RS of the first QCL type, and an RS in a serving cell other than the serving cell for which the TCI state is applied by the terminal is located as the RS of the second QCL type.

6. A base station comprising:

a transmitter that transmits a list of a plurality of serving cells, and transmits configuration information of a plurality of transmission configuration indication (TCI) states applicable to a plurality of types of channels; and a processor that determines a reference signal (RS) of a first quasi co-location (QCL) type and an RS of a second QCL type to be applied to the plurality of serving cells, based on the configuration information and a restriction related to the RS of the first QCL type and the RS of the second QCL type for a demodulation reference signal (DMRS), wherein an RS in a serving cell for which a TCI state is applied by the terminal is configured as the RS of the first QCL type, and an RS in a serving cell other than the serving cell for which the TCI state is applied by the terminal is located as the RS of the second QCL type.

7. A system comprising a terminal and a base station, wherein the terminal comprises:

a receiver that receives a list of a plurality of serving cells, and receives configuration information of a plurality of transmission configuration indication (TCI) states applicable to a plurality of types of channels; and a processor that determines a reference signal (RS) of a first quasi co-location (QCL) type and an RS of a second QCL type to be applied to the plurality of serving cells, based on the configuration information and a restriction related to the RS of the first QCL type and the RS of the second QCL type for a demodulation reference signal (DMRS), and the base station comprises:

a transmitter that transmits the list, and transmits the configuration information, wherein an RS in a serving cell for which a TCI state is applied by the terminal is configured as the RS of the first QCL type, and an RS in a serving cell other than the serving cell for which the TCI state is applied by the terminal is located as the RS of the second QCL type.

\*    \*    \*    \*    \*